(12) United States Patent
Louberg et al.

(10) Patent No.: US 7,769,347 B2
(45) Date of Patent: *Aug. 3, 2010

(54) WIRELESS COMMUNICATION SYSTEM

(75) Inventors: John A Louberg, San Diego, CA (US);
Paul A Johnson, Kihei, HI (US); Eric Korevaar, La Jolla, CA (US)

(73) Assignee: Trex Enterprises Corp., San Diego, CA (US)

( * ) Notice: Subject to any disclaimer, the term of this patent is extended or adjusted under 35 U.S.C. 154(b) by 1063 days.

This patent is subject to a terminal disclaimer.

(21) Appl. No.: 11/327,816

(22) Filed: Jan. 6, 2006

(65) Prior Publication Data

US 2006/0111047 A1 May 25, 2006

Related U.S. Application Data

(63) Continuation-in-part of application No. 10/799,225, filed on Mar. 12, 2004, now Pat. No. 7,062,293, which is a continuation-in-part of application No. 09/952,591, filed on Sep. 14, 2001, now Pat. No. 6,714,800, which is a continuation-in-part of application No. 09/847,629, filed on May 2, 2001, now Pat. No. 6,556,836, and application No. 09/882,482, Jun. 14, 2001, now Pat. No. 6,665,546.

(51) Int. Cl.
*H04B 7/00* (2006.01)
(52) U.S. Cl. .......................... 455/41.2; 455/8; 455/10; 455/25; 455/73; 455/505; 455/67.15; 455/561; 455/562.1; 455/504; 455/506; 455/445

(58) Field of Classification Search ............ 455/8, 455/10, 25, 67.15, 73, 41.2, 504–506, 445, 455/561, 562.1
See application file for complete search history.

(56) References Cited

U.S. PATENT DOCUMENTS

| 6,016,313 | A  | * | 1/2000 | Foster et al. | 370/330 |
| 6,704,579 | B2 | * | 3/2004 | Woodhead et al. | 455/522 |
| 6,757,268 | B1 | * | 6/2004 | Zendle | 370/338 |
| 7,317,708 | B2 | * | 1/2008 | Moon et al. | 370/331 |
| 2003/0050099 | A1 | * | 3/2003 | Izadpanah | 455/562 |

* cited by examiner

*Primary Examiner*—Huy Phan
*Assistant Examiner*—Shantell Heiber
(74) *Attorney, Agent, or Firm*—John R. Ross

(57) ABSTRACT

A communication system providing wireless communication among wireless users through a number of cellular base stations. The system includes a connecting station with a millimeter wave wireless transceiver in communication with a fiber optic or high-speed cable communication network. The transceiver is adapted to communicate at millimeter wave frequencies higher than 60 GHz with another millimeter wave transceiver at one of the cellular base stations. Each of the base stations serves a separate communication cell. Each base station is equipped with a low frequency wireless transceiver for communicating with the wireless users within the cell at a radio frequency lower than 6 GHz. In preferred embodiments the system a part of a telephone system, an Internet system or a computer network.

37 Claims, 23 Drawing Sheets

LOCAL OSCILLATOR
FREQUENCIES:

STATION 1 = 81.344 GHz
STATION 2 = 81.426 GHz
STATION 3 = 81.508 GHz

STATION 31 = 83.804 GHz
STATION 32 = 83.886 GHz

LOCAL OSCILLATOR
FREQUENCIES:

STATION 1 = 66.050 GHz
STATION 2 = 66.225 GHz
STATION 3 = 66.400 GHz

STATION 31 = 69.200 GHz
STATION 32 = 69.375 GHz

-24.000 ns   1.000 ns   26.000 ns
5.00 ns/div   Real time
2  200 mV/
0.00000 V

RECEIVER SIGNAL FROM BERT 200

-4.000 ns   1.000 ns   6.000 ns
1.00 ns/div   Real time
2  500 mV/
0.00000 V

RECEIVER SIGNAL FROM BERT 200

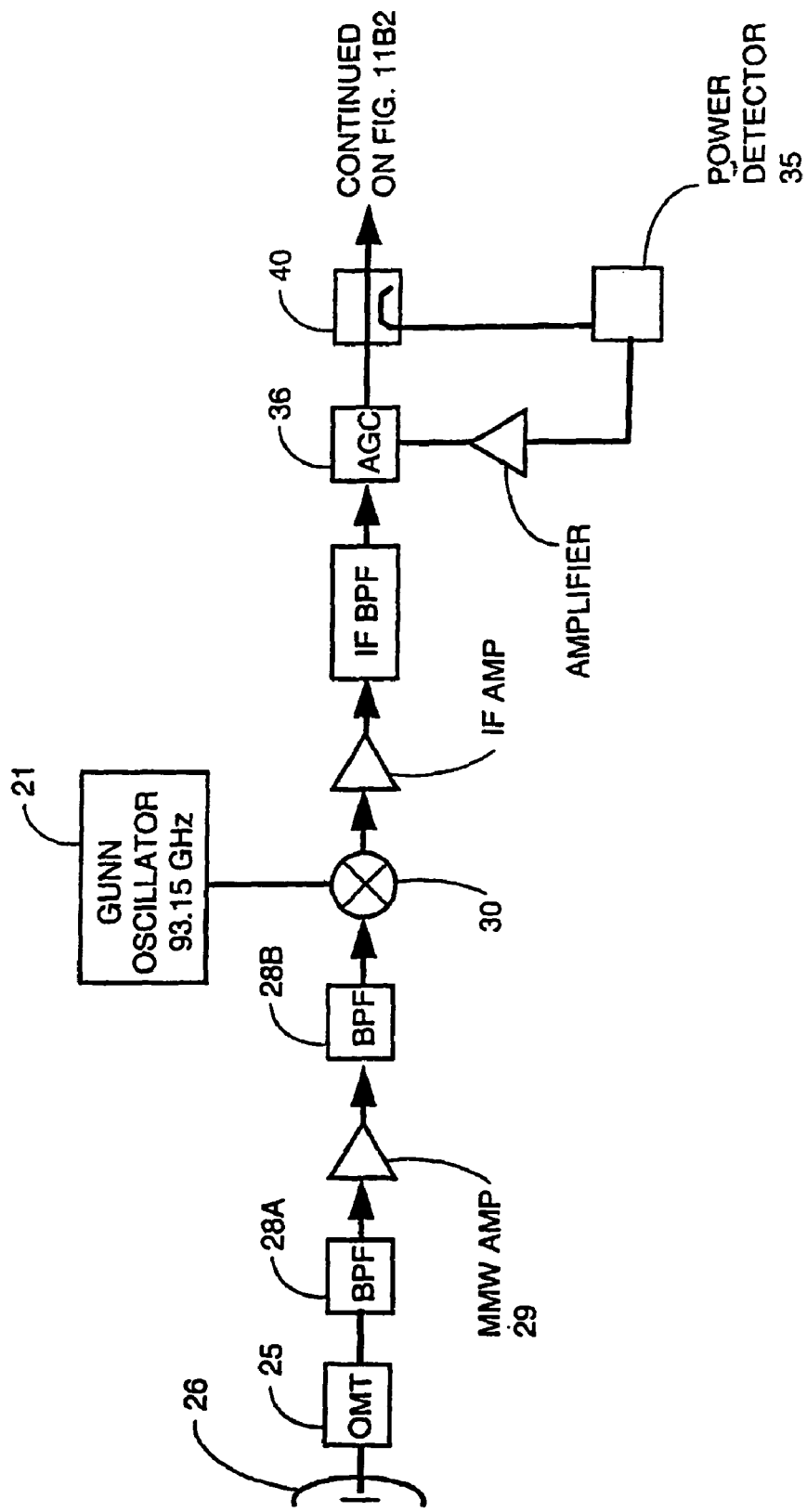
FIG. 11B1

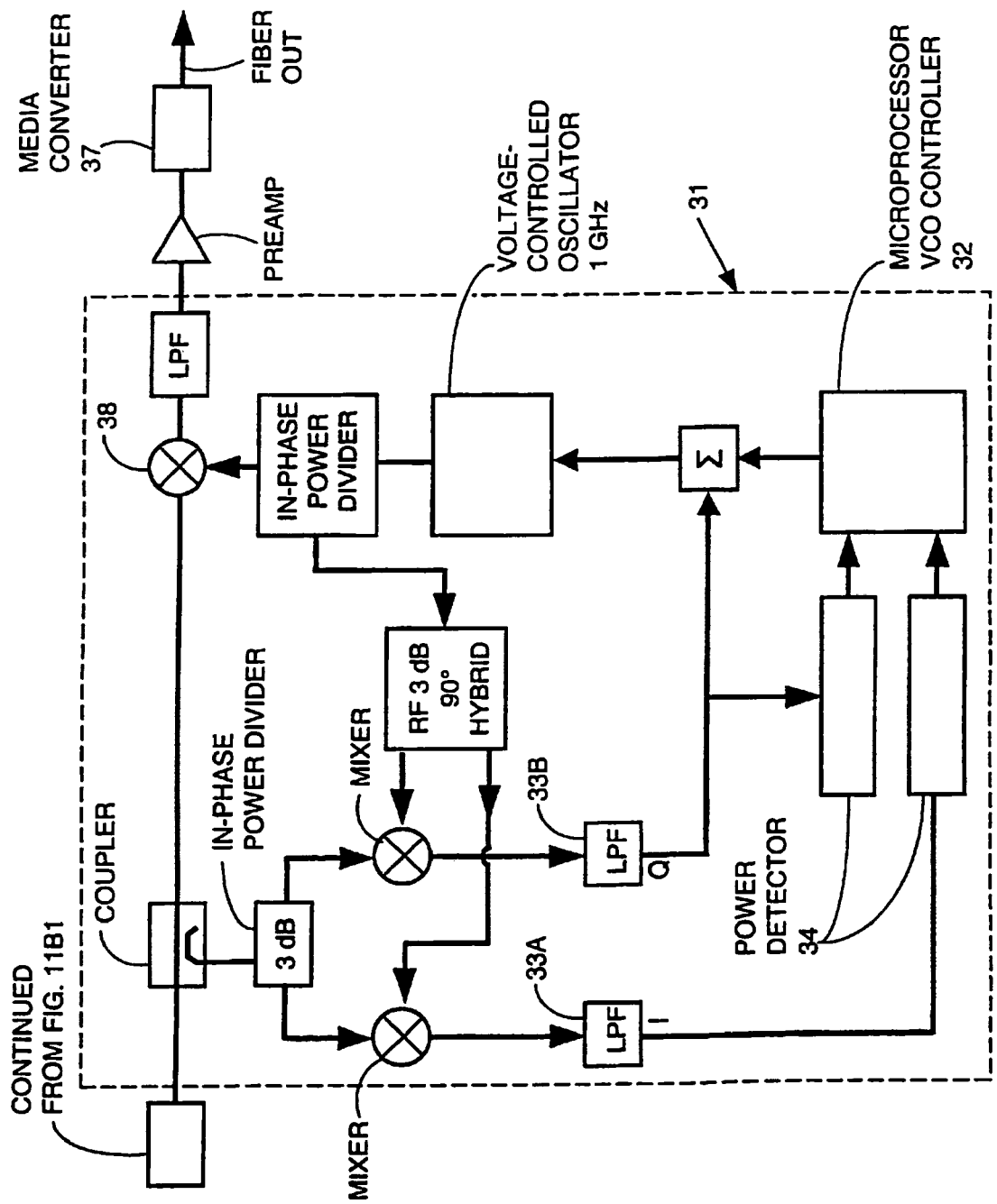
FIG. 11B2

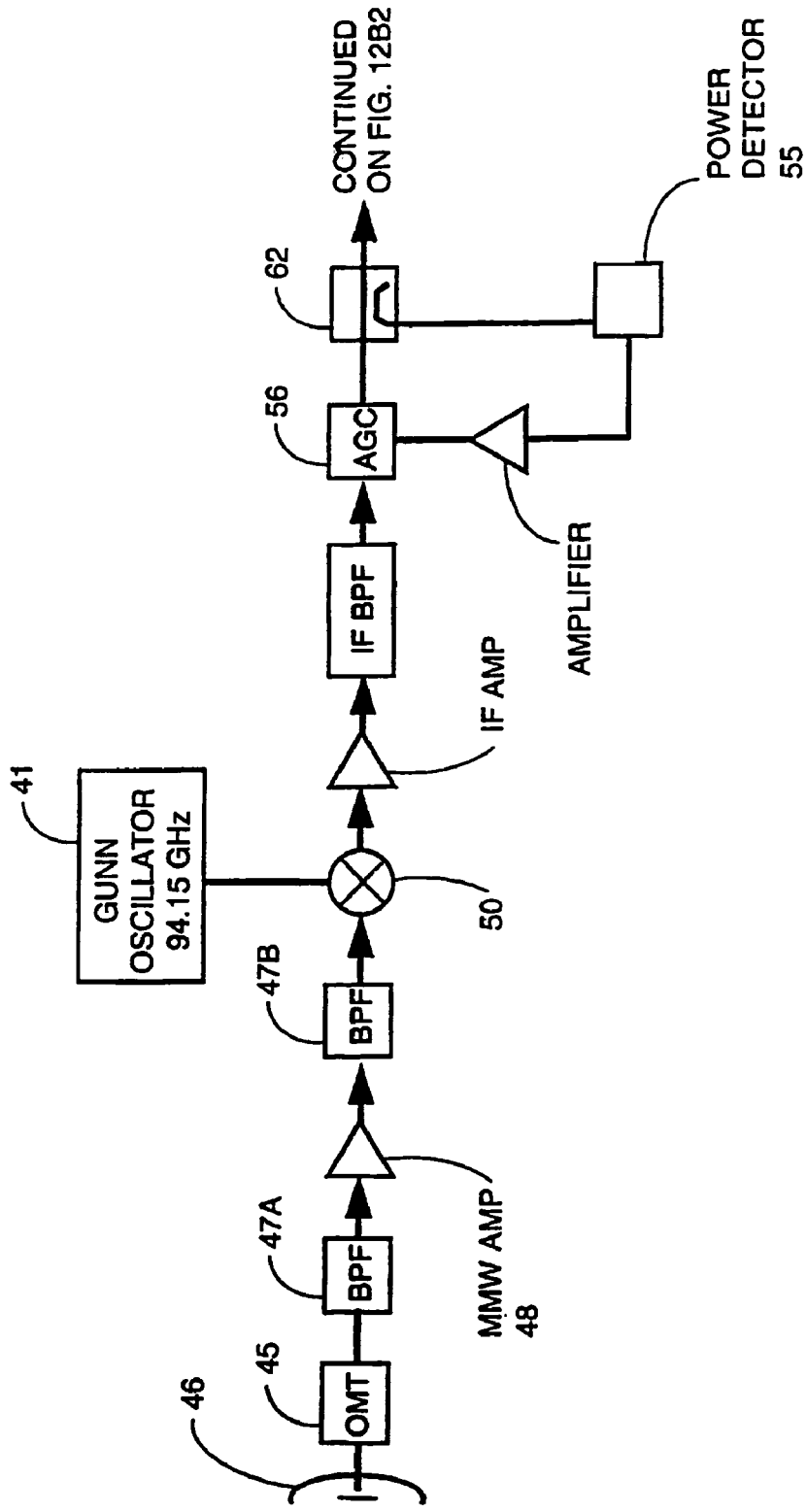
FIG. 12B1

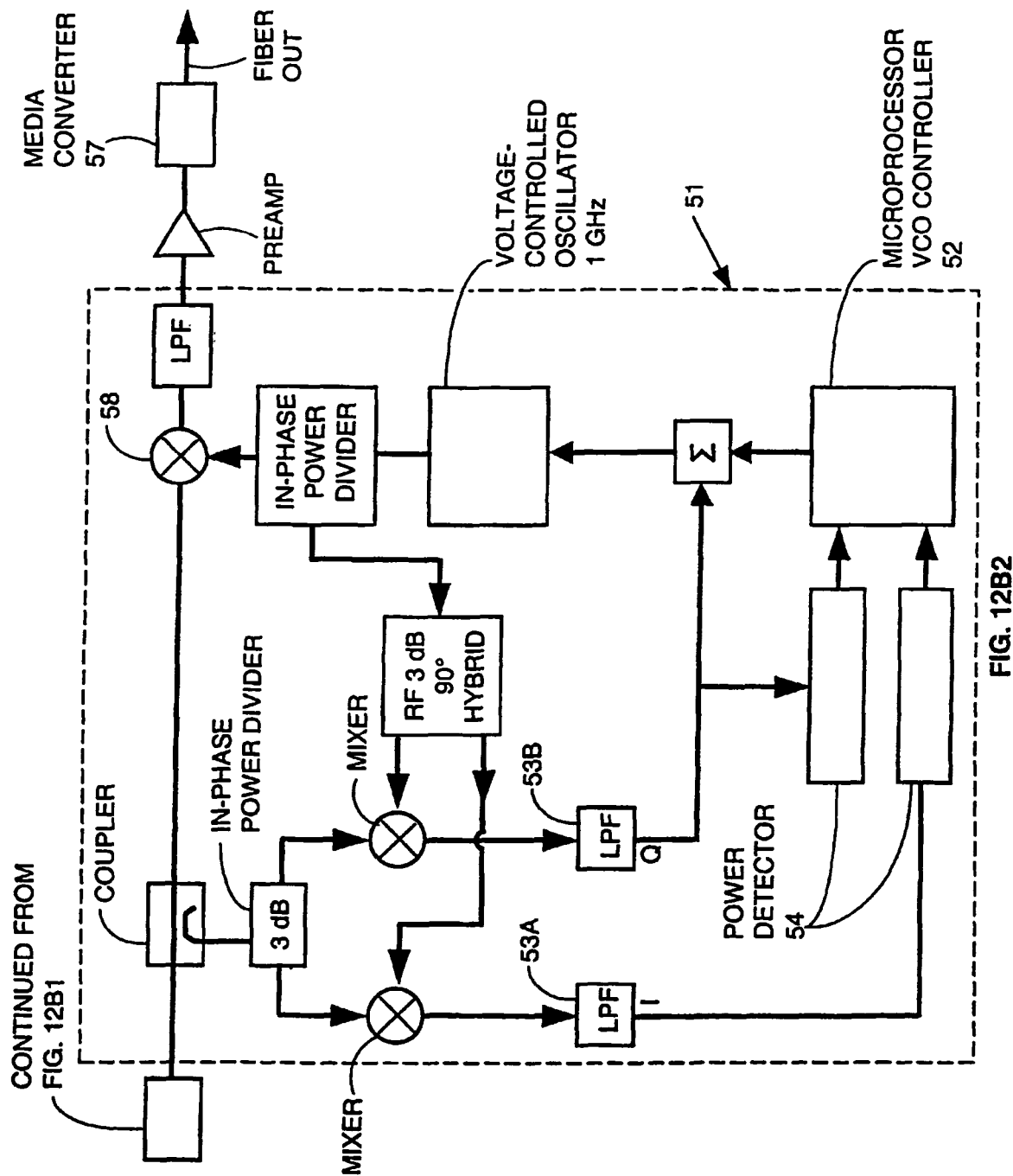
FIG. 12B2

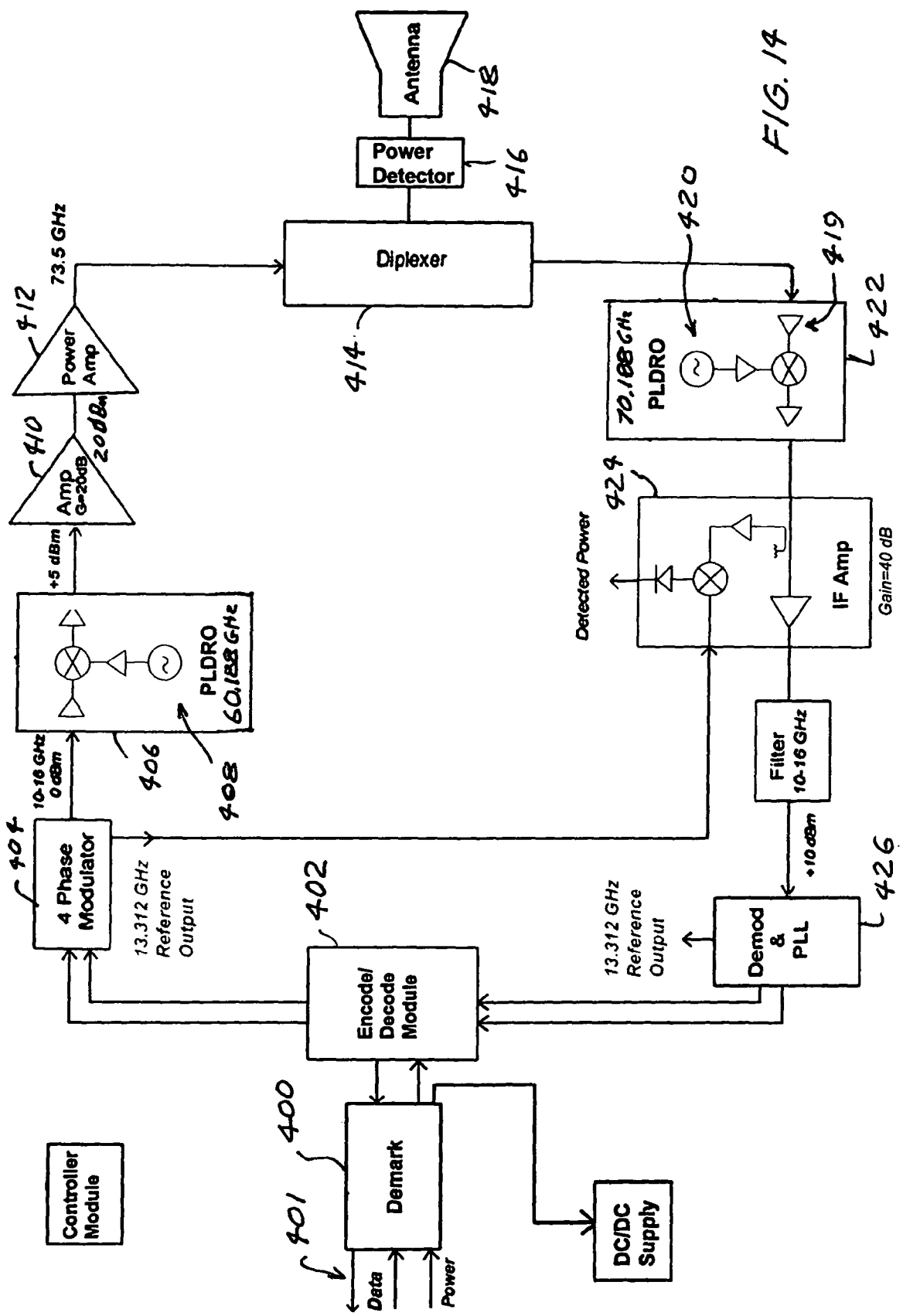

WIRELESS COMMUNICATION SYSTEM

The present invention relates to communication systems with wireless communication links and specifically to high data rate point-to-point links. This application is a continuation-in-part application of Ser. No. 10/799,225 filed Mar. 12, 2004, now U.S. Pat. No. 7,062,293 which was a continuation-in-part of Ser. No. 09/952,591 filed Sep. 14, 2001, now U.S. Pat. No. 6,714,800 that in turn was a continuation-in-part of Ser. No. 09/847,629 filed May 2, 2001, now U.S. Pat. No. 6,556,836, and Ser. No. 09/882,482 filed Jun. 14, 2001, now U.S. Pat. No. 6,665,546.

FEDERALLY SPONSORED RESEARCH

This invention was made in the course of the performance of federally sponsored research work under Contract DASG60-03-0008 with an agency of the United States Government and the federal government has rights in the invention.

BACKGROUND OF THE INVENTION

Local Wireless Radio Communication

Local wireless communication services represent a very rapidly growing industry. These services include paging and cellular telephone services and wireless internet services such as WiFi and WiMax. WiFi refers to communication systems designed for operation in accordance with IEEE 802.11 standards and WiMax refers to systems designed to operate in accordance with IEEE 802.16 standards. Communication under these standards is typically in unlicensed portions of the 2-11 GHz spectral range although the original IEEE 802.16 standard specifies the 10-66 GHz range. Use of these WiFi bands does not require a license in most parts of the world provided that the output of the system is less than 100 milliwatts, but the user must accept interferences from other users of the system. Additional up-to-date descriptions of these WiFi and WiMax systems are available on the Internet from sources such as Google.

The cellular telephone industry currently is in its second generation with several types of cellular telephone systems being promoted. The cellular market in the United States grew from about 2 million subscribers and $2 billion in revenue in 1988 to more than 60 million subscribers and about $30 billion in revenue in 1998 and the growth is continuing in the United States and also around the world as the services become more available and prices decrease. Wireless computer networking and internet connectivity services are also growing at a rapid rate.

FIG. 1 describes a typical cellular telephone system. A cellular service provider divides its territory up into hexagonal cells as shown in FIG. 1. These cells may be about 5 miles across, although in densely populated regions with many users these cells may be broken up into much smaller cells called micro cells. This is done because cellular providers are allocated only a limited portion of the radio spectrum. For example, one spectral range allocated for cellular communication is the spectral range: 824 MHz to 901 MHz. (Another spectral range allocated to cellular service is 1.8 GHz to 1.9 GHz) A provider operating in the 824-901 MHz range may set up its system for the cellular stations to transmit in the 824 MHz to 851 MHz range and to receive in the 869 MHz to 901 MHz range. The transmitters both at the cellular stations and in devices used by subscribers operate at very low power (just a few Watts) so signals generated in a cell do not provide interference in any other cells beyond immediate adjacent cells. By breaking its allocated transmitting spectrum and receive spectrum in seven parts (A-G) with the hexagonal cell pattern, a service provider can set up its system so that there is a two-cell separation between the same frequencies for transmit or receive, as shown in FIG. 1. A one-cell separation can be provided by breaking the spectrum into three parts. Therefore, these three or seven spectral ranges can be used over and over again throughout the territory of the cellular service provider. In a typical cellular system each cell (with a transmit bandwidth and a receive bandwidth each at about 12 MHz wide) can handle as many as about 1200 two-way telephone communications within the cell simultaneously. With lower quality communication, up to about 9000 calls can be handled in the 12 MHz bandwidth. Several different techniques are widely used in the industry to divide up the spectrum within a given cell. These techniques include analog and digital transmission and several techniques for multiplexing the digital signals. These techniques are discussed at pages 313 to 316 in The Essential Guide to Telecommunications, Second Edition, published by Prentice Hall and many other sources. Third generation cellular communication systems promise substantial improvements with more efficient use of the communication spectra.

Other Prior Art Wireless Communication Techniques for Point-to-Point and Point-to-Multi-Point Most wireless communication, at least in terms of data transmitted, is one way, point-to-multi-point, which includes commercial radio and television. However, there are many examples of point-to-point wireless communication. Cellular telephone systems, discussed above, are examples of low-data-rate, point-to-point communication. Microwave transmitters on telephone system trunk lines are another example of prior art, point-to-point wireless communication at much higher data rates. The prior art includes a few examples of point-to-point laser communication at infrared and visible wavelengths.

Information Transmission

Analog techniques for transmission of information are still widely used; however, there has recently been extensive conversion to digital, and in the foreseeable future transmission of information will be mostly digital with volume measured in bits per second. To transmit a typical telephone conversation digitally utilizes about 5,000 bits per second (5 Kbits per second). Typical personal computer modems connected to the Internet operate at, for example, 56 Kbits per second. Music can be transmitted point to point in real time with good quality using MP3 technology at digital data rates of 64 Kbits per second. Video can be transmitted in real time at data rates of about 5 million bits per second (5 Mbits per second). Broadcast quality video is typically at 45 or 90 Mbps. Companies (such as line telephone, cellular telephone and cable companies) providing point-to-point communication services build trunk lines to serve as parts of communication links for their point-to-point customers. These trunk lines typically carry hundreds or thousands of messages simultaneously using multiplexing techniques. Thus, high volume trunk lines must be able to transmit in the gigabit (billion bits, Gbits, per second) range. Most modern trunk lines utilize fiber optic lines. A typical fiber optic line can carry about 2 to 10 Gbits per second and many separate fibers can be included in a trunk line so that fiber optic trunk lines can be designed and constructed to carry any volume of information desired virtually without limit. However, the construction of fiber optic trunk lines is expensive (sometimes very expensive) and the design and the construction of these lines can often take many months especially if the route is over private property or produces environmental controversy. Often the expected revenue from the potential users of a particular trunk line under consideration does not justify the cost of the fiber optic trunk line.

Very high data rate communication trunk lines, such as optical fiber trunk lines or high data rate cable communication systems, currently provide very broad geographical coverage and they are expanding rapidly throughout the world, but they do not go everywhere. Access points to the existing high data rate trunk lines are called "points of presence". These points of presence are physical locations that house servers, routers, ATM switches and digital/analog call aggregators. For Internet systems, these locations may be the service provider's own equipment or part of the facilities of a telecommunications provider that an Internet service provider rents.

Digital microwave communication has been available since the mid-1970's. Service in the 18-23 GHz radio spectrum is called "short-haul microwave" providing point-to-point service operating between 2 and 7 miles and supporting between four to eight T1 links (each carrying data at 1.544 Mbps). Recently, microwave systems operating in the 11 to 38 Ghz band have been designed to transmit at rates up to 155 Mbps (which is a standard transmit frequency known as "OC-3 Standard") using high order modulation schemes.

Data Rate and Frequency

Bandwidth-efficient modulation schemes allow, as a general rule, transmission of data at rates of about 1 to 8 bits per second per Hz of available bandwidth in spectral ranges including radio wave lengths to microwave wavelengths. Data transmission requirements of 1 to tens of Gbps thus would require hundreds of MHz of available bandwidth for transmission. Equitable sharing of the frequency spectrum between radio, television, telephone, emergency services, military, and other services typically limits specific frequency band allocations to about 10% fractional bandwidth (i.e., range of frequencies equal to about 10% of center frequency). AM radio, at almost 100% fractional bandwidth (550 to 1650 KHz) is an anomaly; FM radio, at 20% fractional bandwidth, is also a typical compared to more recent frequency allocations, which rarely exceed 10% fractional bandwidth.

Reliability Requirements

Reliability typically required for trunkline wireless data transmission is very high, consistent with that required for hard-wired links including fiber optics. Typical specifications for error rates are less than one bit in ten billion ($10^{-10}$ bit-error rate), and link availability of 99.999% (5 minutes of down time per year). This necessitates all-weather link operability, in fog and snow, and at rain rates up to 100 mm/hour in many areas. On the other, hand cellular telephone systems and wireless internet access systems do not require such high reliability. As a matter of fact cellular users (especially mobile users) are accustomed to poor service in many regions.

Weather Conditions

In conjunction with the above availability requirements, weather-related attenuation limits the useful range of wireless data transmission at all wavelengths shorter than the very long radio waves. Typical ranges in a heavy rainstorm for optical links (i.e., laser communication links) are 100 meters, and for microwave links, 10,000 meters.

Atmospheric attenuation of electromagnetic radiation increases generally with frequency in the microwave and millimeter-wave bands. However, excitation of rotational modes in oxygen and water vapor molecules absorbs radiation preferentially in bands near 60 and 118 GHz (oxygen) and near 23 and 183 GHz (water vapor). Rain attenuation, which is caused by large-angle scattering, increases monotonically with frequency from 3 to nearly 200 GHz. At the higher, millimeter-wave frequencies, (i.e., 30 GHz to 300 GHz corresponding to wavelengths of 1.0 centimeter to 1.0 millimeter) where available bandwidth is highest, rain attenuation in very bad weather limits reliable wireless link performance to distances of 1 mile or less. At microwave frequencies near and below 10 GHz, link distances to 10 miles can be achieved even in heavy rain with high reliability, but the available bandwidth is much lower.

Setting-Up Additional Cells in a Telephone System is Expensive

The cost associated with setting up an additional cell in a new location or creating a micro cell within an existing cell with prior art techniques is in the range of about $650,000 to $800,000. (See page 895 Voice and Data Communication Handbook, Fourth Edition, published by McGraw Hill.) These costs must be recovered from users of the cellular system. People in the past have avoided use of their cellular equipment because the cost was higher that their line telephones. Recently, costs have become comparable.

The Need

Therefore, a great need exists for techniques for adding, at low cost, additional cells in cellular communication systems and for techniques for adding wireless internet access points at low costs.

SUMMARY OF THE INVENTION

The present invention provides a communication system providing wireless communication among wireless users through a number of cellular base stations. The system includes a connecting station with a millimeter wave wireless transceiver in communication with a fiber optic or high-speed cable communication network. The transceiver is adapted to communicate at millimeter wave frequencies higher than 60 GHz with another millimeter wave transceiver at one of the cellular base stations. Each of the base stations serves a separate communication cell. Each base station is equipped with a low frequency wireless transceiver for communicating with the wireless users within the cell at a radio frequency lower than 6 GHz and a millimeter wave wireless transceiver operating at a millimeter wave frequency higher than 60 GHz for communicating with another millimeter wave transceiver at another base station or a millimeter wave transceiver at said at the connecting station. The base stations are also equipped with data transfer means for transferring data communicated through the low frequency wireless transceiver to the millimeter wave wireless transceiver and for transferring data communicated through the millimeter wave wireless transceiver to the low frequency wireless transceiver. In preferred embodiments the system is a part of a telephone system, an Internet system or a computer network.

The millimeter wave transceivers at the base stations are equipped with antennas providing beam divergence small enough to ensure efficient spatial and directional partitioning of the data channels so that an almost unlimited number of point-to-point transceivers will be able to simultaneously use the same millimeter wave spectrum. In preferred embodiments the millimeter wave trunk line interfaces with an Internet network at an Internet point of presence. In a preferred embodiment the trunk line communication link operates within the 71-76 and 81-86 GHz portions of the millimeter wave spectrum. A large number of base stations are each allocated a few MHz portion of the 5 GHz bandwidths of the millimeter wave trunk line in each direction. A first transceiver transmits at 71-76 GHz and receives at 81-86 GHz, both within the above spectral range. A second transceiver transmits at 81-86 GHz and receives at 71-76 GHz.

Antennas are described to maintain beam directional stability to less than one-half the half-power beam width. In the preferred embodiment where the spectral ranges are 71-76 GHz and 81-86 GHz, the half power beam width is about 0.4 degrees or less for a 2-foot antenna. The millimeter wave trunk line bandwidth is efficiently utilized over and over again by using transmitting antennae that are designed to produce very narrow beams directed at receiving antennae. The low frequency wireless internet access bandwidth is efficiently utilized over and over again by dividing a territory into small cells and using low power antennae. In preferred embodiments wireless internet access base stations are prepackaged for easy, quick installation at convenient locations such as the tops of commercial buildings. In other embodiments the base stations may be mounted on trucks that can be moved quickly to a location to provide emergency or temporary high data rate communication.

BRIEF DESCRIPTION OF THE DRAWINGS

FIGS. 11A and 11B are schematic diagrams of a millimeter-wave transmitter and receiver in one transceiver of a preferred embodiment of the present invention.

FIGS. 12A and 12B are schematic diagrams of a millimeter-wave transmitter and receiver in a complementary transceiver of a preferred embodiment of the present invention.

FIG. 14 is a schematic diagram of a millimeter wave transmitter and receiver in an additional preferred embodiment of the present invention.

DETAILED DESCRIPTION OF PREFERRED EMBODIMENTS

Millimeter Wave Trunk Lines

A first preferred embodiment of the present invention comprises a system of linked millimeter-wave radios which take the place of wire or fiber optic links between the cells of a cellular network. A second preferred embodiment of the present invention comprises a system of linked millimeter wave radios which take the place of wire or fiber optic links between wireless Internet access base stations or wireless computer networking base stations. The use of the millimeter-wave links can eliminate the need to lay cable or fiber, can be installed relatively quickly, and can provide high bandwidth normally at a lower cost than standard telecom-provided wires or cable. Since the millimeter-wave links simply up and down convert the signal for point-to-point transmission, the data and protocols used by the original signals are preserved, making the link 'transparent' to the user. These trunk lines can support a conventional system operating at standard cellular telephone frequencies, but it is equally applicable to other, newer technologies such as 1.8 GHz to 1.9 GHz PCS systems, wireless internet frequencies, computer networking frequencies and systems operating at frequencies such as 2.4 GHz, 3.5 GHz and 5.8 GHz.

Cellular Phone Base Station

Figure 3A:
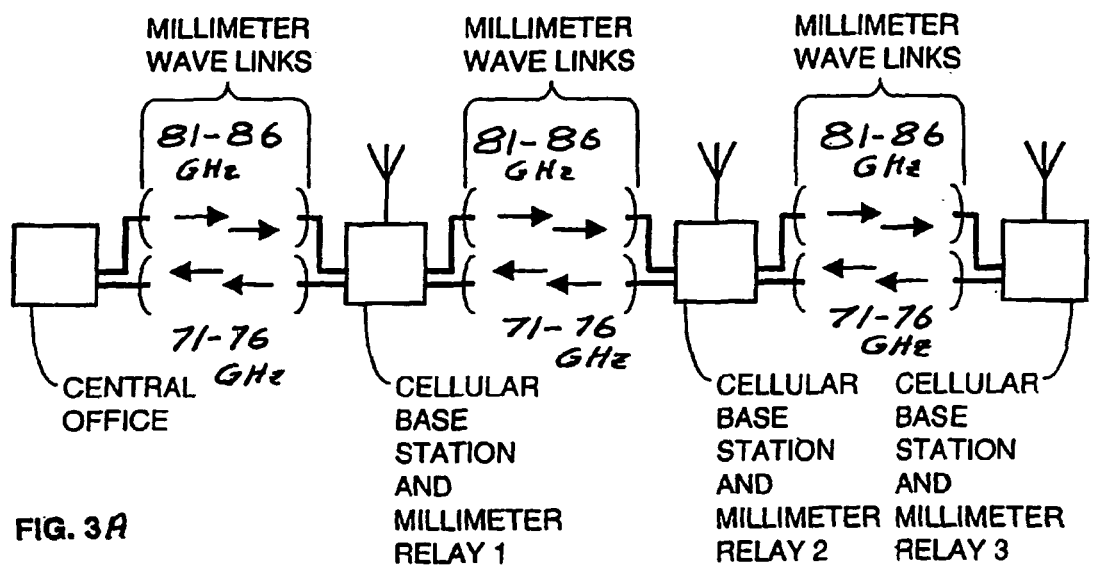
FIG. 3A is a sketch of a millimeter wave trunk line connecting cellular base stations.

A typical prior art cell phone base station transmits in the 824-851 MHz band and receives in the 869-901 MHz band and is connected to a mobile telephone switching office by wire connections which is in turn connected to a central office via a high speed wired connection. The central office performs call switching and routing. It is possible to replace both wired links with a millimeter-wave link, capable of carrying the signals from several cellular base stations to the central office for switching and routing, and then back out again to the cellular base stations for transmission to the users' cellular phones and other communication devices. A millimeter-wave link with 1 GHz of bandwidth will be capable of handling approximately 30 to 90 cellular base stations, depending on the bandwidth of the base stations. Since the cellular base stations are typically within a few miles (or less for micro cells) of each other, the millimeter-wave link would form a chain from base station to base station, then back to the central office. FIG. 3A illustrates the basic concept for a telephone system.

Cellular Base Station Transmission Back to Central Office

Cell phone calls are received in the 824-851 MHz band at each group of base stations, and up-converted to a 27 MHz slot of frequencies in the 71-76 GHz band for transmission over the link back to the central office. Each group of base stations is allocated a 27 MHz slice of spectrum in the 71-76 GHz band as follows:

| 1 Base Station Group Number | Base Station Frequency | Trunk Line Frequency |
|---|---|---|
| 1 | 824-851 MHz | 72.293-72.320 GHz |
| 2 | 824-851 MHz | 72.370-72.397 GHz |
| 3 | 824-851 MHz | 72.447-72.474 GHz |
| . | . | . |
| . | . | . |
| . | . | . |
| 30 | 824-851 MHz | 74.526-74.553 GHz |
| 31 | 824-851 MHz | 74.603-74.630 GHz |
| 32 | 824-851 MHz | 74.680-74.707 GHz |

Figure 4:
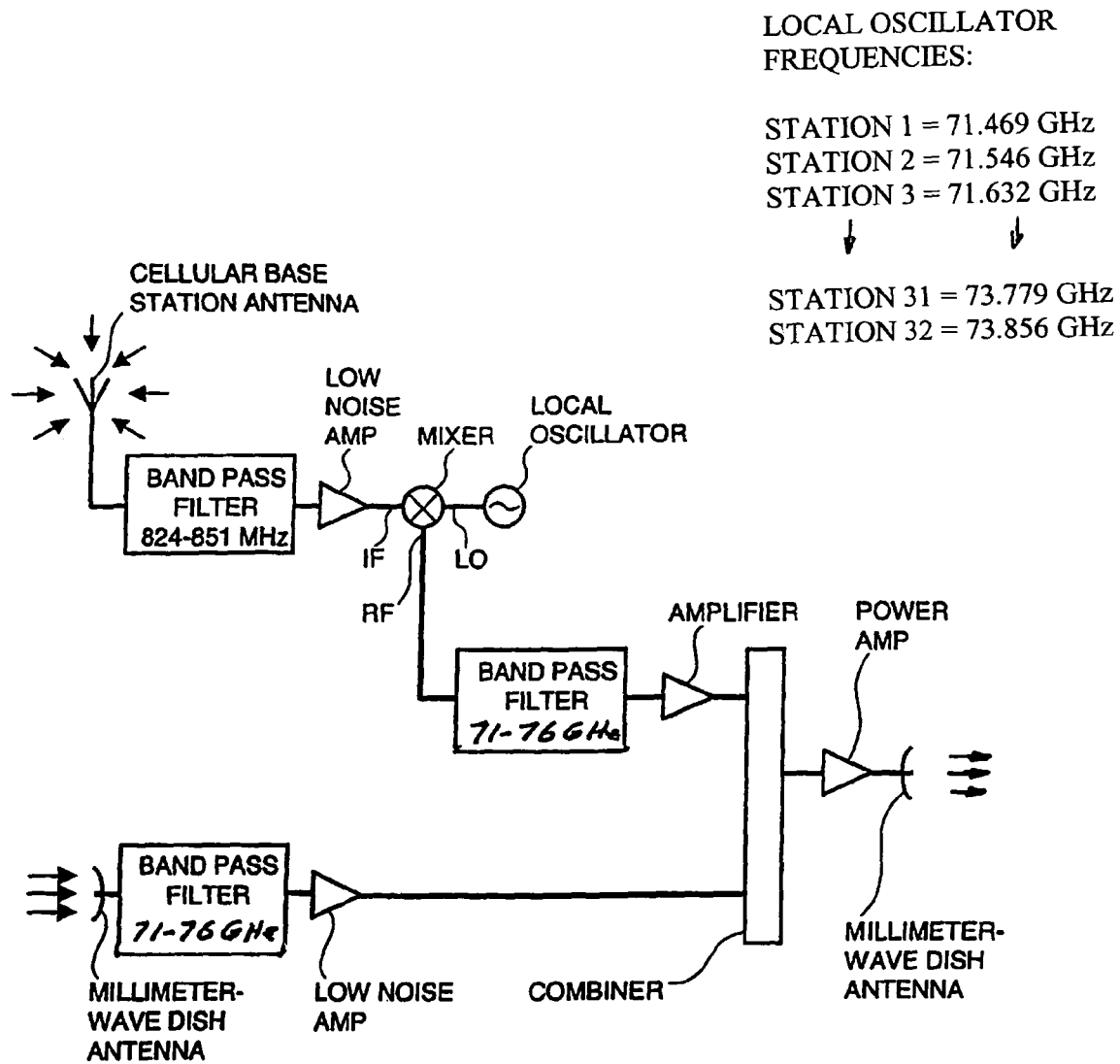
FIG. 4A demonstrates up conversion from cell phone frequencies to trunk line frequencies.
FIG. 4B demonstrates up conversion from wireless internet access frequencies to trunk line frequencies FIG. 5A demonstrates down conversion from trunk line frequencies to cell phone frequencies.
Figure 4:
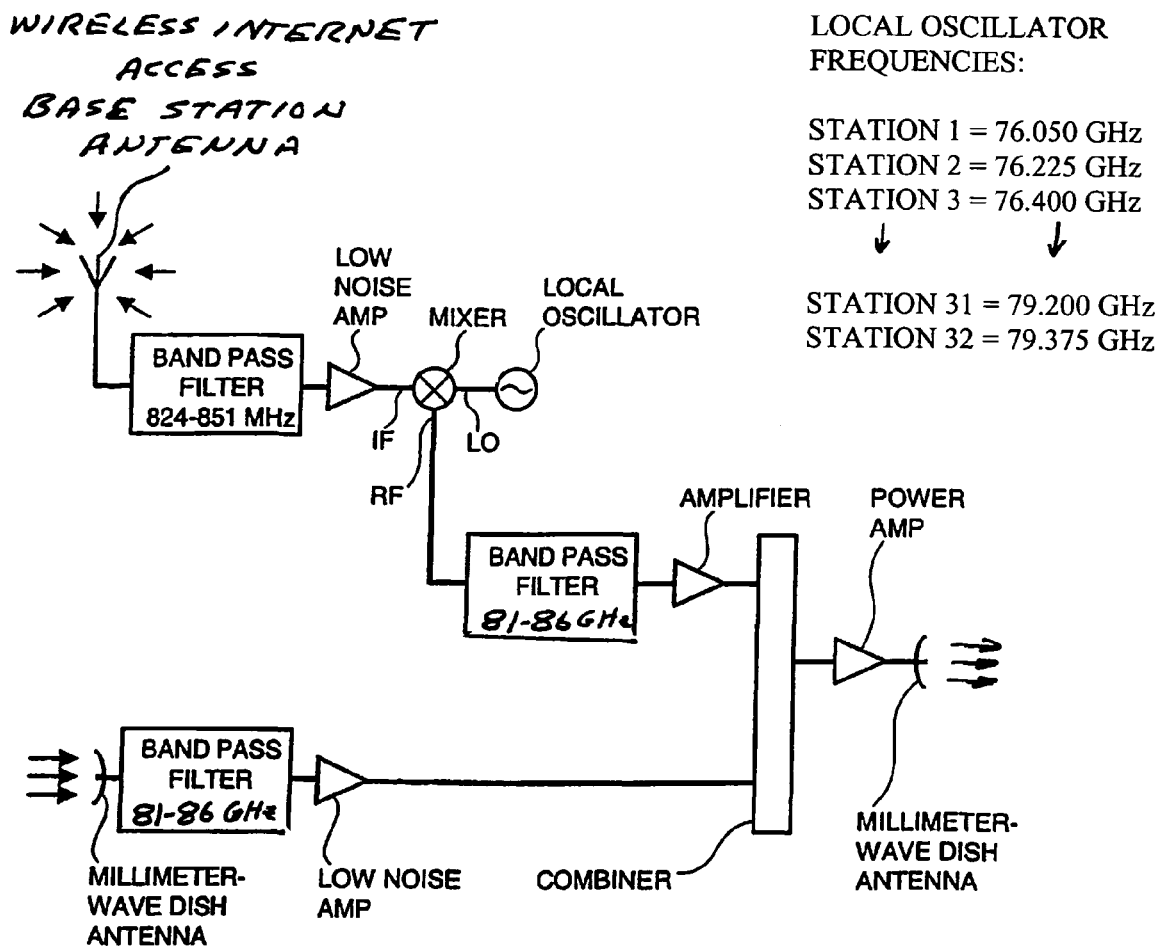

FIG. 4 shows a block diagram of a system that converts the cellular base station frequencies up to the millimeter-wave band for transmission back to the central office. Each base station receives both the cell phone frequencies within its cell, and the millimeter-wave frequencies from the earlier base station in the chain. The cell-phone frequencies are up-converted to a slot (of spectrum) in the 71-76 GHz band and added to the 71-76 GHz signals from the earlier base station up the chain. The combined signals are then retransmitted to the next base station in the chain. Each base station has a local oscillator set to a slightly different frequency, which determines the up-converted frequency slot for that base station. The local oscillator may be multiplied by a known pseudo-random bit stream to spread its spectrum and to provide additional security to the millimeter-wave link.

At the telephone company central switching office, each 27 MHz slot of frequencies in the 71-76 GHz band is downconverted to the cellular telephone band. If a spread-spectrum local oscillator was used on the millimeter-wave link, the appropriate pseudo random code must be used again in the downconverter's local oscillator to recover the original information. Once the millimeter-wave signals are downconverted to the cell phone band, standard cellular equipment is used to detect, switch, and route the calls.

Central Office Transmission to Cellular Base Stations

Cell phone calls leave the central office on a millimeter-wave link and each group of cellular base stations down converts a 32 MHz slice of the spectrum to the cell phone band for transmission to the individual phones. The cellular base stations transmit (to the phones) in the 869-901 MHz band so each group of base stations requires a 32 MHz slice of the spectrum in the 81-86 GHz range on the millimeter wave link. The 5 GHz bandwidth will easily support 32 base stations. Each group of base stations is allocated a 32 MHz slice of spectrum in the 81-86 GHz band as follows:

| Base Station Group Number | Trunk Line Frequency | Base Station Frequency |
|---|---|---|
| 1 | 82.213-82.245 GHz | 869-901 MHz |
| 2 | 82.295-82.327 GHz | 869-901 MHz |
| 3 | 82.377-82.409 GHz | 869-901 MHz |
| . | . | . |
| . | . | . |
| . | . | . |
| 30 | 84.591-84.623 GHz | 869-901 MHz |
| 31 | 84.673-84.705 GHz | 869-901 MHz |
| 32 | 84.755-84.787 GHz | 869-901 MHz |

Base station # Trunk Line Frequencies (link RX) Converts to Base Station (cell TX)

Figure 5A:
FIG. 5B demonstrates down conversion from trunk line frequencies to wireless internet access frequencies.
Figure 5A:
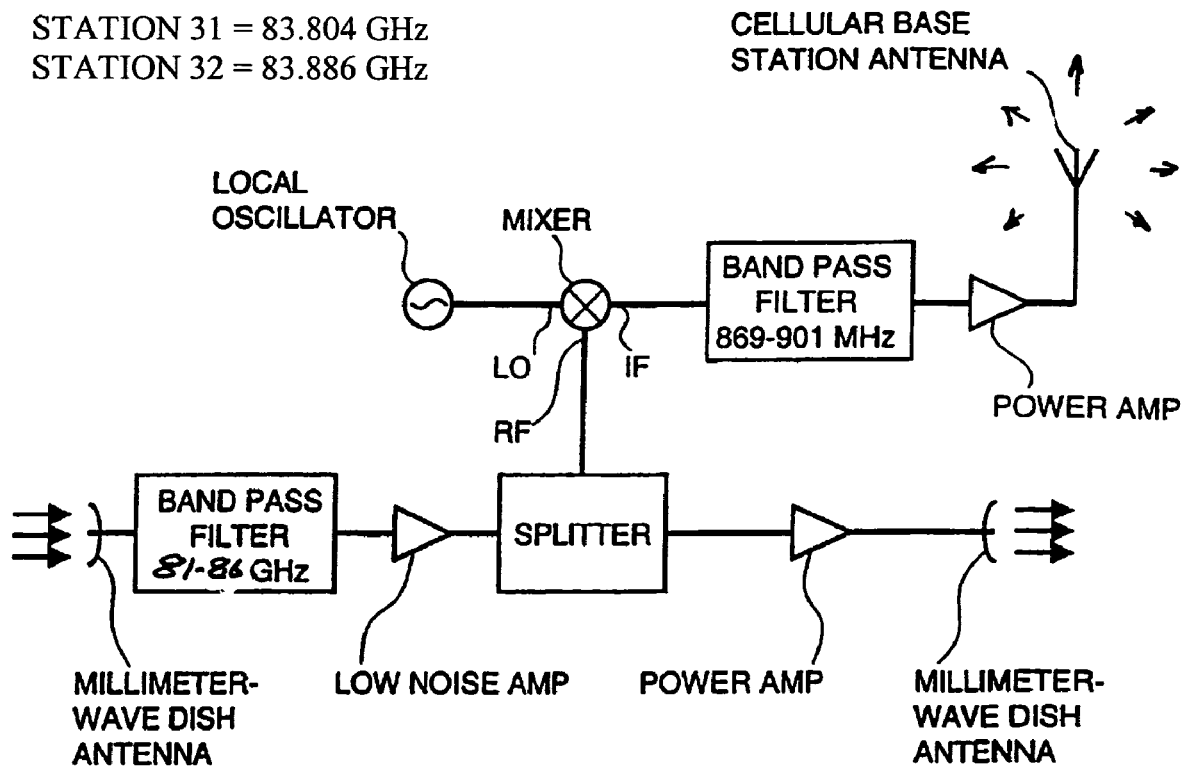

FIG. 5A shows a block diagram of a system that receives millimeter-wave signals from the central office and converts them to the cellular band for transmission by a cell base station. Each base station receiver picks off the signals in its 32 MHz slice of the 81-86 GHz spectrum, down-converts this band to the cell phone band, and broadcasts it. The 81-86 GHz band is also retransmitted to the next base station in the chain. Each base station has a local oscillator set to a slightly different frequency, which determines the 32 MHz wide slot (in the 81-86 GHz band) that is assigned to that base station. If a spread-spectrum local oscillator was used on the up-conversion at the central office, then the appropriate pseudo random code must be used again in the down-converter's local oscillator each base station) to recover the original information.

At the telephone company central switching office calls are detected, switched, and routed between the various cellular base stations and the landline network. Each group of cellular base stations is represented at the central office by a 32 MHz wide slot of spectrum, which is up-converted to the 81-86 GHz band and sent out over a point-to-point link to the chain of several base stations. The local oscillator used to up-convert the signal may be spread-spectrum to provide additional security to the millimeter-wave link.

Wireless Computer Networks and Wireless Internet

Figure 1:
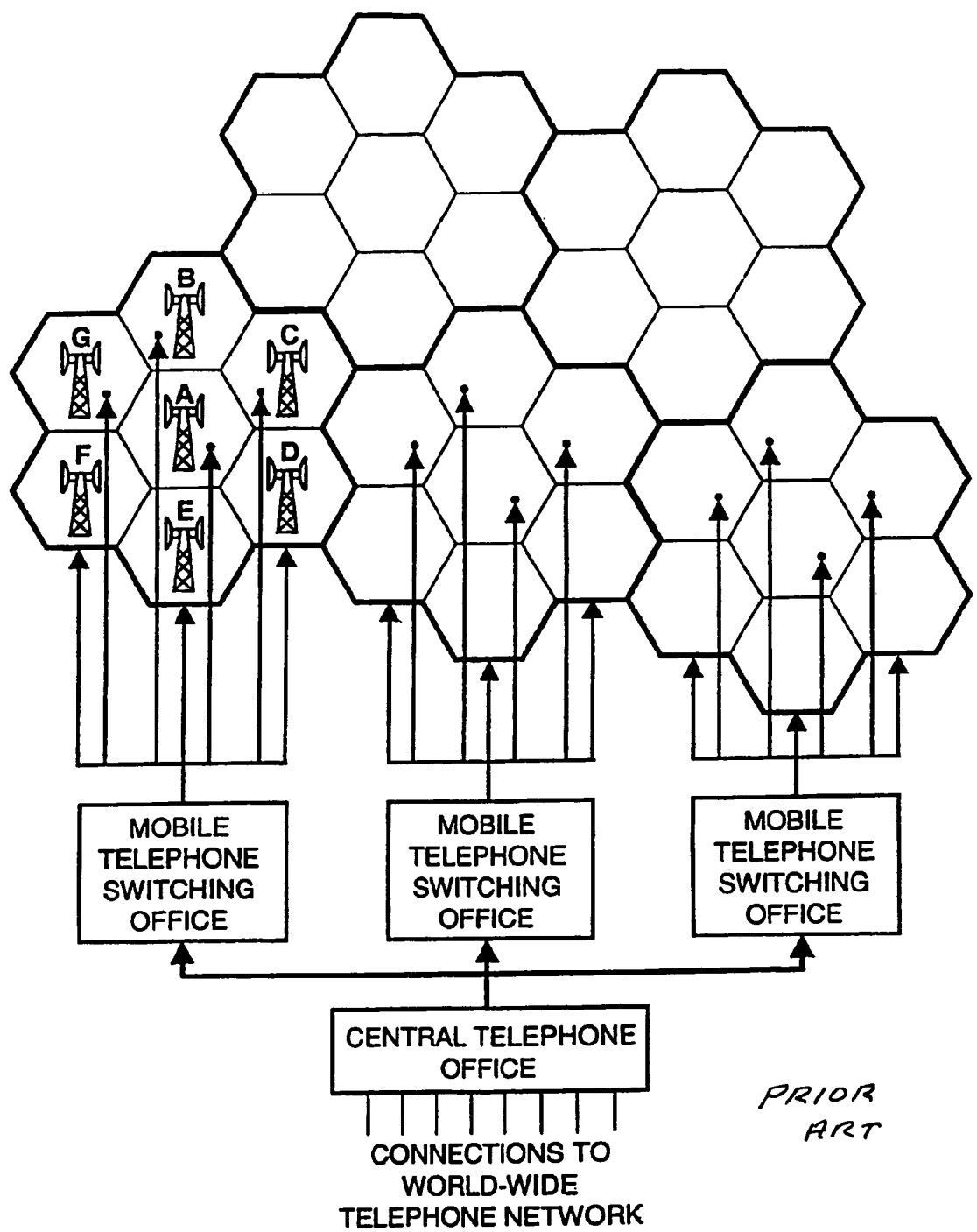
FIG. 1 is a sketch showing a prior art cellular network.

Most wireless computer networking equipment on the market today is designed according to IEEE standards 802.11a and 802.11b that describe a format and technique for packet data interchange between computers. In this equipment the 802.11b formatted data is transmitted and received on one of eleven channels in the 2.4-2.5 GHz band and uses the same frequencies for transmit and receive. Therefore, in preferred embodiments the cellular stations all operate on a slice of the 2.4 to 2.5 GHz band using equipment built in accordance with the above IEEE standards. An up/down converter is provided to up and down convert the information for transmittal on the millimeter wave links. The up/down converter is described below. Typically, base stations are organized in generally hexagonal cells in groups of 7 cells (similar to cellular phone networks) as shown in FIG. 1. In order to avoid interference, each of the 7 cells operate at a different slice of the available bandwidth in which case each frequency slice is separated by two cells. If 3 different frequencies are used in the group of 7 cells, there is a one-cell separation of frequencies.

A typical prior art wireless internet access base station, or access point, providing wireless computer networking, transmits and receives in one of a few designated bands. These bands include the 2.4 GHz unlicensed band, with typical operation between 2.4 and 2.4835 GHz (radios using IEEE standards 802.11b or 802.11g operate in this band), the 3.5 GHz licensed band, with typical operation between 3.4 and 3.6 GHz (radios using IEEE standards 802.16c and 802.16d operate in this band), and the license exempt 5.8 GHz band, with typical operation between 5.725 and 5.85 GHz (this band is part of the FCC designated U-NII band intended for community networking communications devices operating over a range of several kilometers). The 802.16 standards for wireless computer networking are sometimes referred to as WiMax. The 802.11 standards are sometimes referred to as WiFi. These standards can be used in many different frequency bands as specified in the IEEE standards. In the specifications which follow, specific implementation examples have been given in the 5.725 GHz to 5.85 GHz band, but this is not to be taken as any limitation.

Figure 3B:
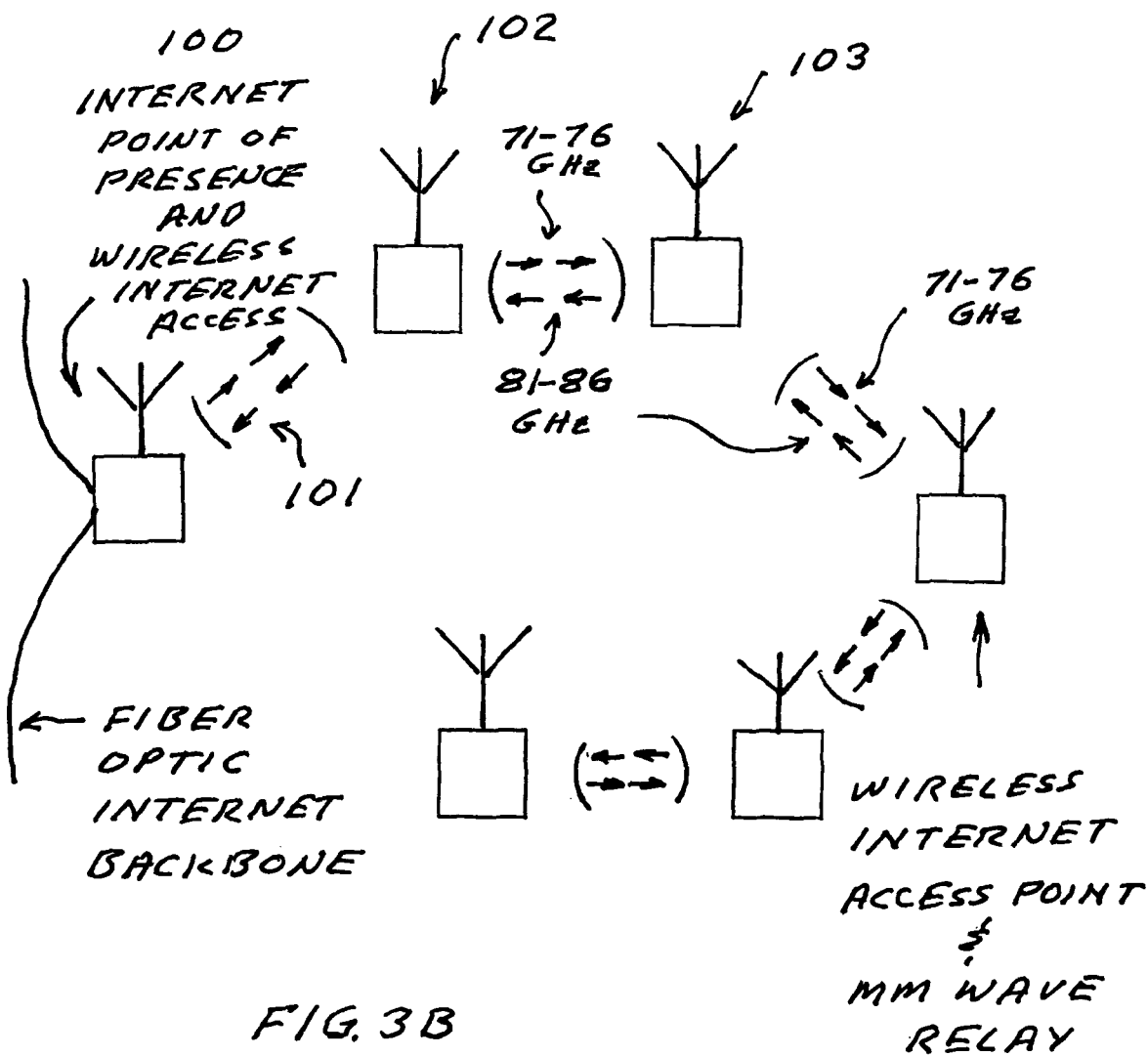
FIG. 3B is a sketch of a millimeter wave trunk line connecting wireless internet access base stations.

FIG. 3B shows how wireless internet access points (or WiMax or WiFi or wireless computer networking access points) might be connected to the fiber optic internet backbone according to the present invention. At some location 100 on the Internet backbone there is what is referred to as a "point of presence", which is a location where there is access to the fiber backbone. Alternately, there could be a switch or router at this location without any wireless access point. In the figure, a high speed millimeter wave communications link 101 provides a connection between this point of presence and a second wireless internet access point 102 at a location remote from the fiber point of presence, but visible through an unobstructed line of sight. The wireless internet access point provides wireless internet or other computing connections to users within some geographic region surrounding the access point, using equipment according to one of the wireless standards (such as IEEE 801.16) and radios operating in one of the designated frequency bands (such as 5.725 to 5.85 GHz). These radios are manufactured and operate according to principles and designs known in the relevant art. Continuing on, this second wireless internet access point communicates with a third wireless internet access point (or base station) 104 through another high bandwidth millimeter wave line of sight communications link 103. In the figure, this communications link is shown to use the 71-76 GHz frequency band in one direction (away from the fiber point of presence) and the 81-86 GHz frequency band in the other direction (towards the fiber point of presence). Because the communications carrying capacity of the high frequency millimeter wave links is much greater than the communications bandwidth needed at each wireless internet access base station, many such base stations can be connected in this manner as indicated generally at 105.

Wireless Internet Base Station Transmission Back to Fiber Point of Presence

Wireless computer networking communications traffic is received in the 5725-5850 MHz band at each base station, and up-converted to a 125 MHz slot of frequencies in the 81-86 GHz band for transmission over the millimeter wave link back to the fiber point of presence. Each base station is allocated a 125 MHz slice of spectrum in the 81-86 GHz band as follows, with appropriate guard bands (in this case with 50 MHz width):

| Base Station Number | Base Station Frequency | Trunk Line Frequency |
|---|---|---|
| 1 | 5725-5850 MHz | 81.775-81.900 GHz |
| 2 | 5725-5850 MHz | 81.950-82.075 GHz |
| 3 | 5725-5850 MHz | 82.125-82.250 GHz |
| . | . | . |
| . | . | . |
| . | . | . |
| 18 | 5725-5850 MHz | 84.750-84.875 GHz |
| 19 | 5725-5850 MHz | 84.925-85.050 GHz |
| 20 | 5725-5850 MHz | 85.100-85.225 GHz |

FIG. 4B shows a block diagram of a system that converts the wireless internet base station frequencies up to the millimeter-wave band for transmission back to the central office. Each base station receives both the wireless computer networking frequencies within its geographical coverage area, and the millimeter-wave frequencies from the earlier base station in the chain. The wireless computer networking frequencies are up-converted to a slot (of spectrum) in the 81-86 GHz band and added to the 81-86 GHz signals from the earlier base station up the chain. The combined signals are then retransmitted to the next base station in the chain. Each base station has a local oscillator set to a slightly different frequency, which determines the up-converted frequency slot for the base station.

At the fiber point of presence, each 125 MHz slot of frequencies in the 81-86 GHz band is downconverted to the wireless internet access band, where standard equipment is used to recover the original wireless user traffic. This user traffic is then combined digitally for switching or routing onto the internet backbone, and then on to the desired recipient location.

Fiber Point of Presence Transmission to Wireless Internet Base Stations

Internet or wireless computing traffic with user destinations served by the wireless base stations is separated from the rest of the internet traffic on the backbone at the internet or fiber Point of Presence. The traffic destined for each base station is formatted for the appropriate low frequency wireless channel (for example, 5725-5850 GHz) and then upconverted to a 125 MHz slot in the 71-76 GHz spectrum, with each base station being allocated a different slot. At each base station the appropriate slice of spectrum is then down-converted for transmission to individual users in the 5725 to 5850 GHz band. Since each base station requires less than 125 MHz of bandwidth, the 71-76 GHz millimeter wave spectral band (5,000 MHz) will easily support 20 different base stations, even allowing for 50 MHz guard bands. Each base station is allocated a 125 MHz slice of spectrum in the 71-76 GHz band as follows:

| Base Station Number | Base Station Frequency | Trunk Line Frequency |
|---|---|---|
| 1 | 5725-5850 MHz | 71.775-71.900 GHz |
| 2 | 5725-5850 MHz | 71.950-72.075 GHz |
| 3 | 5725-5850 MHz | 72.125-72.250 GHz |
| . | . | . |
| . | . | . |
| . | . | . |
| 18 | 5725-5850 MHz | 74.750-74.875 GHz |

-continued

| Base Station Number | Base Station Frequency | Trunk Line Frequency |
|---|---|---|
| 19 | 5725-5850 MHz | 74.925-75.050 GHz |
| 20 | 5725-5850 MHz | 75.100-75.225 GHz |

Figure 5B:
Figure 5B:
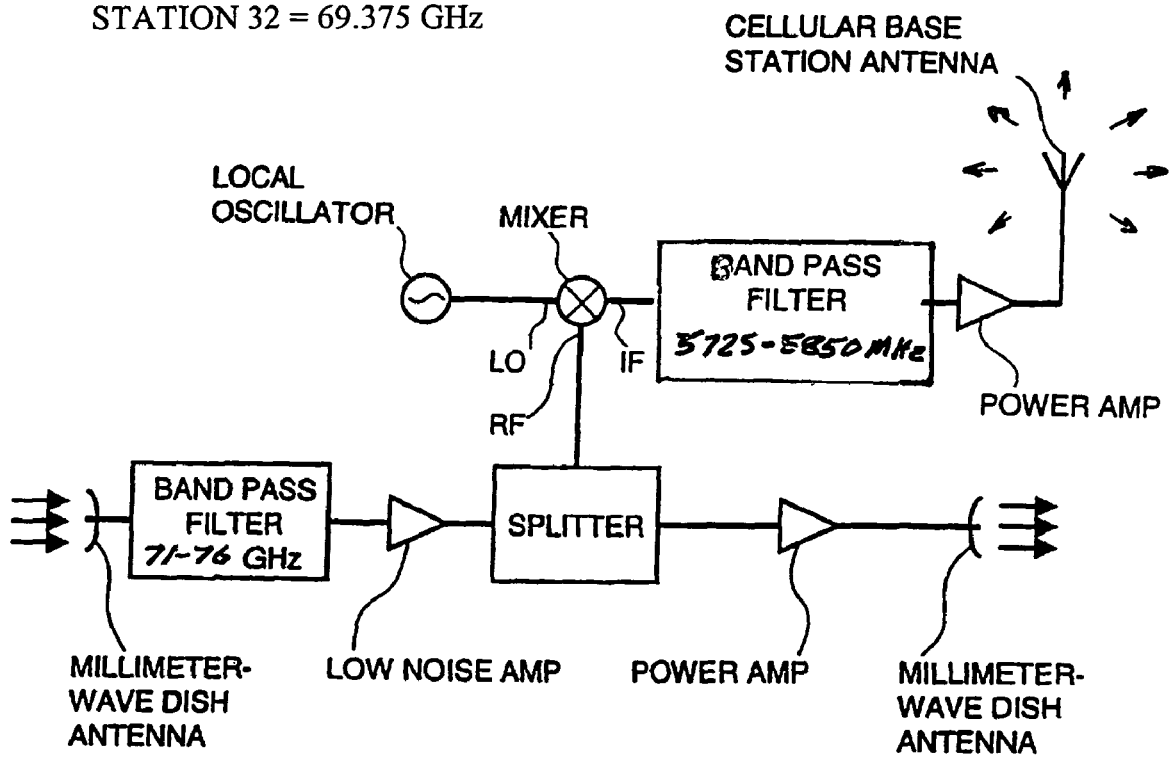

FIG. 5B shows a block diagram of a system that receives millimeter-wave signals from the fiber point of presence and converts them to the wireless internet band for transmission by a wireless base station. Each wireless internet base station picks off the signals in its 125 MHz slice of the 71-76 GHz spectrum, downconverts this slice to the wireless internet band, and broadcasts it. The 71-76 GHz band is also retransmitted to the next base station in the chain. Each base station has a local oscillator set to a slightly different frequency, which determines the 125 MHz wide slot (in the 71-76 GHz band) that is assigned to that base station.

WiFi Hot Spots

Figure 6A:
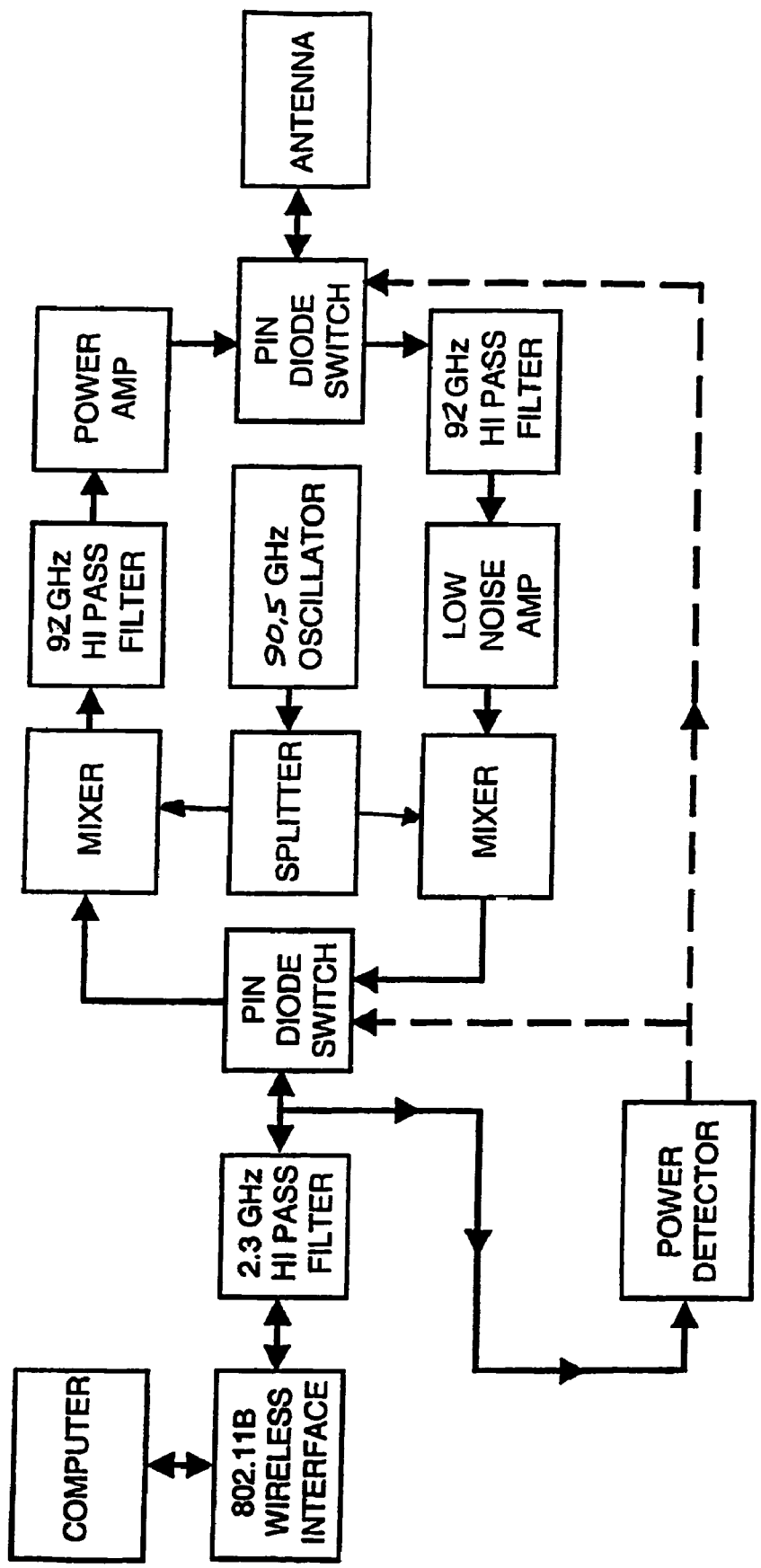
FIG. 6A is a block diagram showing the principal components of a prepackaged wireless internet access station designed for roof-top installation.

In addition to serving wireless internet or WiMax base stations through a millimeter wave trunk line, individual wireless hotspots (WiFi hotspots) based on the IEEE 802.11 standard can be served by a millimeter wave backhaul link as described in FIG. 6A. In this figure, reference is made to frequencies in the 92-94 GHz millimeter wave band (which is part of the 92-94 and 94.1-95 GHz bands allocated by the FCC for point to point millimeter wave links). A computer connected to an 802.11b wireless interface operating in the 2.4-2.4835 GHz ISM band has its communications up-converted to or down-converted from the 92-94 GHz millimeter wave band by combination with a 90.5 GHz local oscillator. Time division duplexing (via a PIN Diode Switch) is used to separate signals to be transmitted by the computer from signals to be received by the computer (or more generally the WiFi hotspot). Signals in the 92-94 GHz millimeter wave band are transmitted by and received by the Antenna in the right of the diagram, and again send and receive are separated at different time slots by a PIN diode switch. Hot Spots such as the one described in FIG. 6A could also be served by trunk line systems operating within the 71 to 76 GHz and 81 to 86 GHz bands described in detail above.

Digital Transmission

In the preferred embodiments for the use of a millimeter wave trunk line serving a series of cellular base stations or wireless computer networking (or internet) base stations discussed thus far, the architecture has been discussed in terms of an analog system wherein low frequency radio or microwave bands associated with each base station were upconverted to specific slots in a high frequency millimeter wave band for transmission back to a central office or to the internet backbone. Different base stations were allocated different slots in the high frequency millimeter wave spectrum. One millimeter wave band (say 71-76 GHz in the case of wireless internet access) was used for transmission from the central network to the base stations, and a different band (say 81-86 GHz in the case of wireless internet access) was used for transmission from the base stations back to the central network. In an alternate preferred embodiment, all of the information received from the low frequency microwave broadcast systems is digitized at the base stations, and combined in a digital fashion for backhaul transmission across the high frequency millimeter wave links. Similarly, the information destined for users of the wireless network is sent from the central office or internet point of presence in a digital format across the high frequency millimeter wave links, and then separated out at each appropriate base station and converted to the appropriate analog waveforms for transmission by the low frequency microwave systems. Standard digital switches and routers can be used for the combination and separation of the digital data, based on user destination addresses embedded in individual data packets.

Figure 6B:
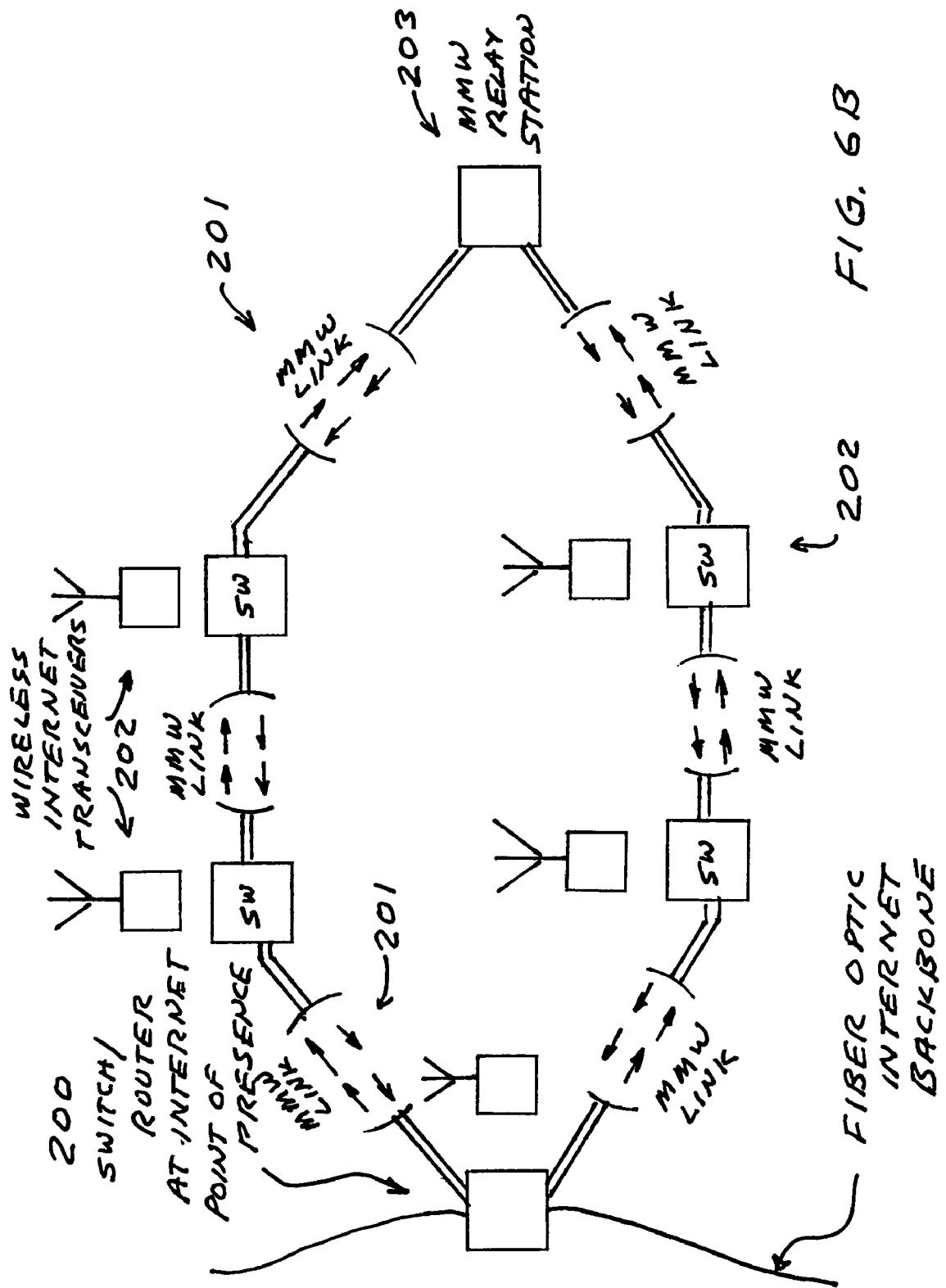
FIG. 6B is a sketch of a millimeter wave trunk line connecting Internet access base stations using digital communication.

FIG. 6B, which is analogous to FIG. 3B, shows a series of wireless internet access point transceivers operating as base stations 202, each with its own coverage area for wireless users, communicating to and from the fiber optic internet backbone at a fiber point of presence 200, using high frequency millimeter wave links. In FIG. 6B, the information on the millimeter wave links is digitized, and transmitted as indicated at 201 using some digital protocol such as gigabit Ethernet at 1.25 Gb/s. User communications are separated from the internet backbone using a standard digital switch or router, and then separated from the millimeter wave links using a switch or router at the appropriate destination base station. Similarly, user communications are combined with other traffic on the millimeter wave links using switches or routers at each base station. In this way, the millimeter wave links serve in exactly the same way as fiber optic links which carry digital information, except that the millimeter wave links are wireless. In addition, the millimeter wave links and wireless internet access point transceivers can be arranged in a loop or other network configuration to provide redundancy in case of failure at one of the nodes or links. (That is, there are two or more paths that communication traffic can take between the fiber optic backbone and the wireless internet base stations, so that if one path is unavailable, the traffic can be routed along an alternate path).

Figure 6C:
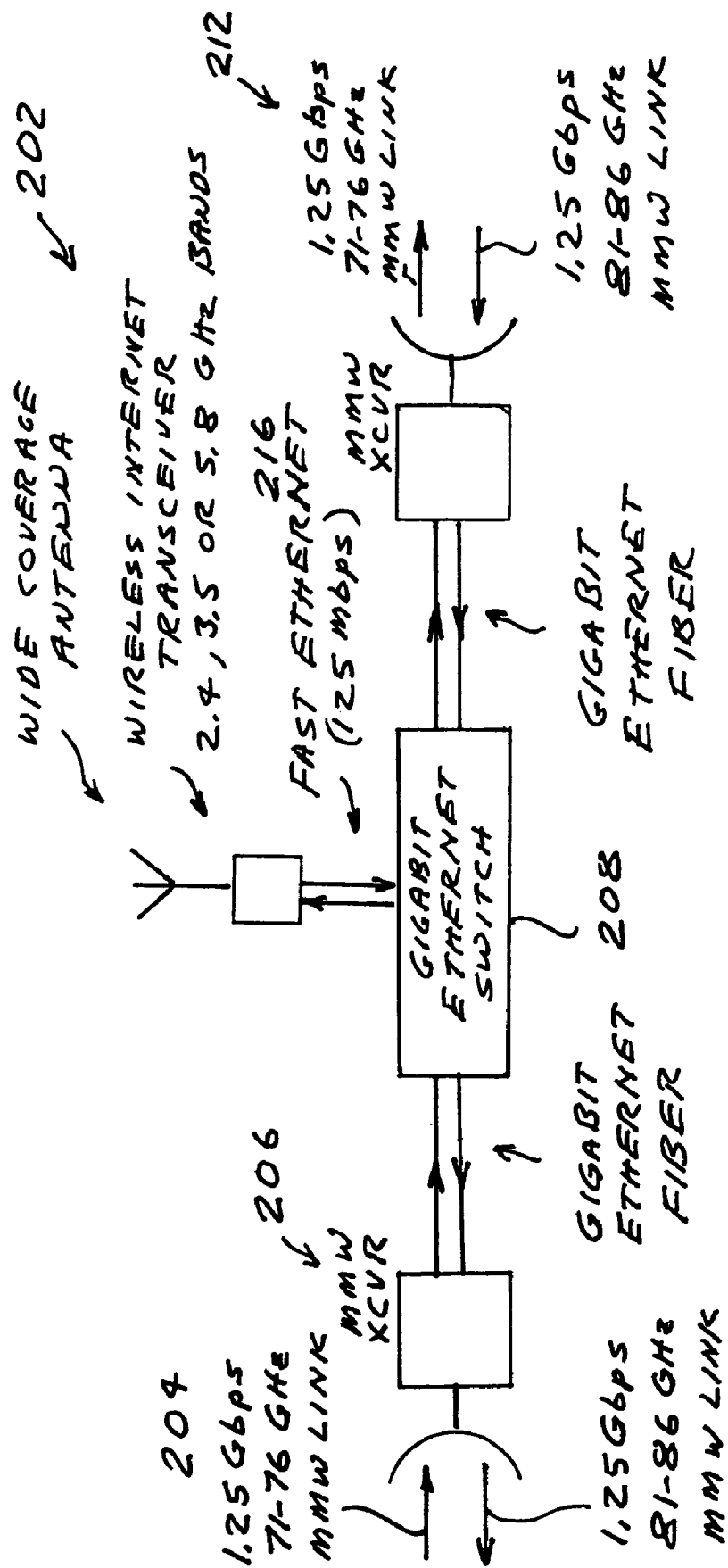
FIG. 6C demonstrates switching of digital wireless Internet traffic on to and off of a trunk line.

FIG. 6C shows details of how the equipment at a base station 202 according to FIG. 6B would be arranged. Information from one millimeter wave link is incident from the left at 204 in the 71-76 GHz millimeter wave band operating at a digital data rate of 1.25 Gbps according to the gigabit Ethernet standard. Millimeter wave transceiver 206 converts the information on the millimeter wave link (which may be modulated by many means including on-off keying, phase shift keying such as BPSK or QPSK, etc.) to digital base band information. Gigabit Ethernet switch 208 separates out any packets from the digital base band data stream which have destinations with wireless users served by that base station, and transfers them via a fast Ethernet link at 125 Mbps to wireless Internet transceiver 210 for broadcast (after appropriate modulation format conversion) from the wireless internet transceiver operating in one of several possible bands such as 2.4, 3.5 or 5.8 GHz. At the same time, information from a second millimeter wave link is incident from the right as shown at 212 in the 81-86 GHz millimeter wave band on a second gigabit Ethernet data stream. This information is converted by the millimeter wave transceiver 210 on the right to base band, and is also processed by the gigabit Ethernet switch 208 to separate out any traffic with a user destination at that base station. User communications which are received by the wireless internet transceiver 214 from users within its geographical coverage area are digitized and transferred to the gigabit Ethernet switch through a 125 Mbps fast Ethernet link 216. The switch then combines this user communications data with data which was received by the switch on the gigabit Ethernet ports from either the left or right transceiver, and sends this out for transmission by either the millimeter wave transceiver on the left or the millimeter wave transceiver on the right, depending on the data packet destination address and the current routing table being used. Data is transmitted along the link to the left at 1.25 Gbps using the 81-86 GHz millimeter wave band, and data is transmitted along the link to the right at 1.25 Gbps using the 71-76 GHz millimeter wave band. While the equipment residing at the base station has been described here as consisting of separate elements (which might currently be purchased from different vendors) it should be appreciated that these separate elements can be combined into a single piece of equipment (or a smaller subset of equipment than that which is shown).

Figure 6D:
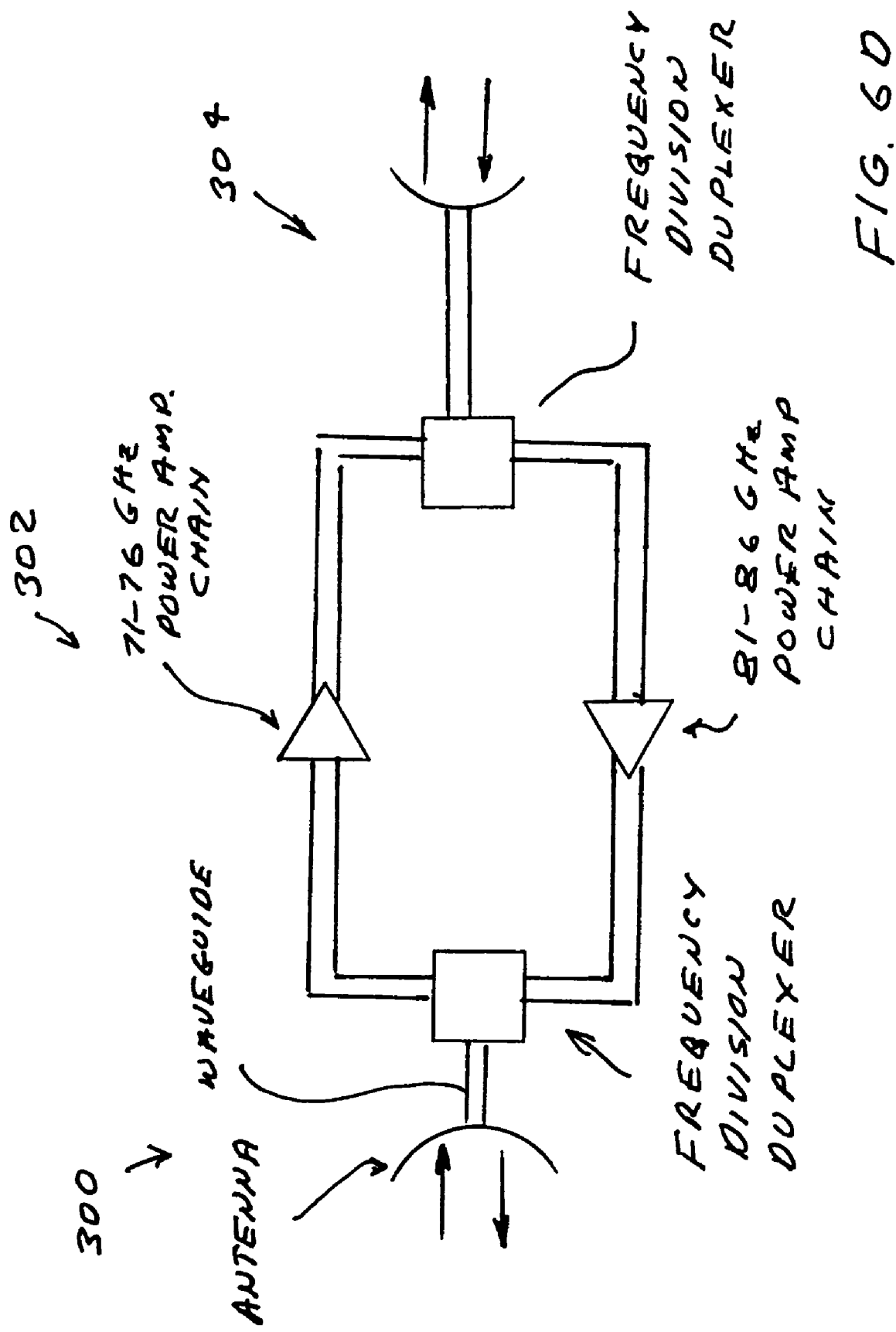
FIG. 6D demonstrates use of a millimeter wave amplifier in a trunk line relay station.

FIG. 6B also shows a millimeter wave relay station 203 (at the right) where there is no switch or wireless internet access base station or transceiver. Such a relay station is useful in cases where there is no line of sight link path between two base stations, or where the distance between two base stations is too far to support a millimeter wave link with the desired high weather availability. FIG. 6D shows a possible configuration for such a relay station which does not require any signal downconversion or upconversion for operation. In this example, a millimeter wave link operating at 71-76 GHz is incident from the left on an antenna 300. The signal from the antenna is separated by a frequency duplex diplexer capable of separating out frequencies in the 71-76 GHz band from frequencies in the 81-86 GHz band. The incident signal is then amplified by a power amplifier chain 302, which might be a series of amplifiers including a low noise amplifier, a high gain amplifier, and a power amplifier. The amplified signal is then transferred to a second antenna on the right via a second frequency division diplexer for transmission along a millimeter wave link on the right. Note that the data modulation on the signal has not been accessed or converted, but that the power has been amplified and redirected towards another station. Similarly, millimeter wave radiation received by antenna 304 on the right in the 81-86 GHz band is separated by a frequency division diplexer, amplified, and then directed via a frequency division diplexer to the antenna 300 on the left for transmission along the left millimeter wave link. (Although gigabit Ethernet protocol was specified in the examples described above, other protocols for digital transmission, such as OC-24 (1.244 Gbps) or OC-48 (2.488 Gbps) may be used.)

Prototype Demonstration of MM Wave T/R

A prototype demonstration of the millimeter-wave transmitter and receiver useful for the present invention is described by reference to FIGS. 7 to 10. With this embodiment the Applicants originally demonstrated digital data transmission in the 93 to 97 GHz range at 1.25 Gbps with a bit error rate below $10^{-12}$.

Figure 7:
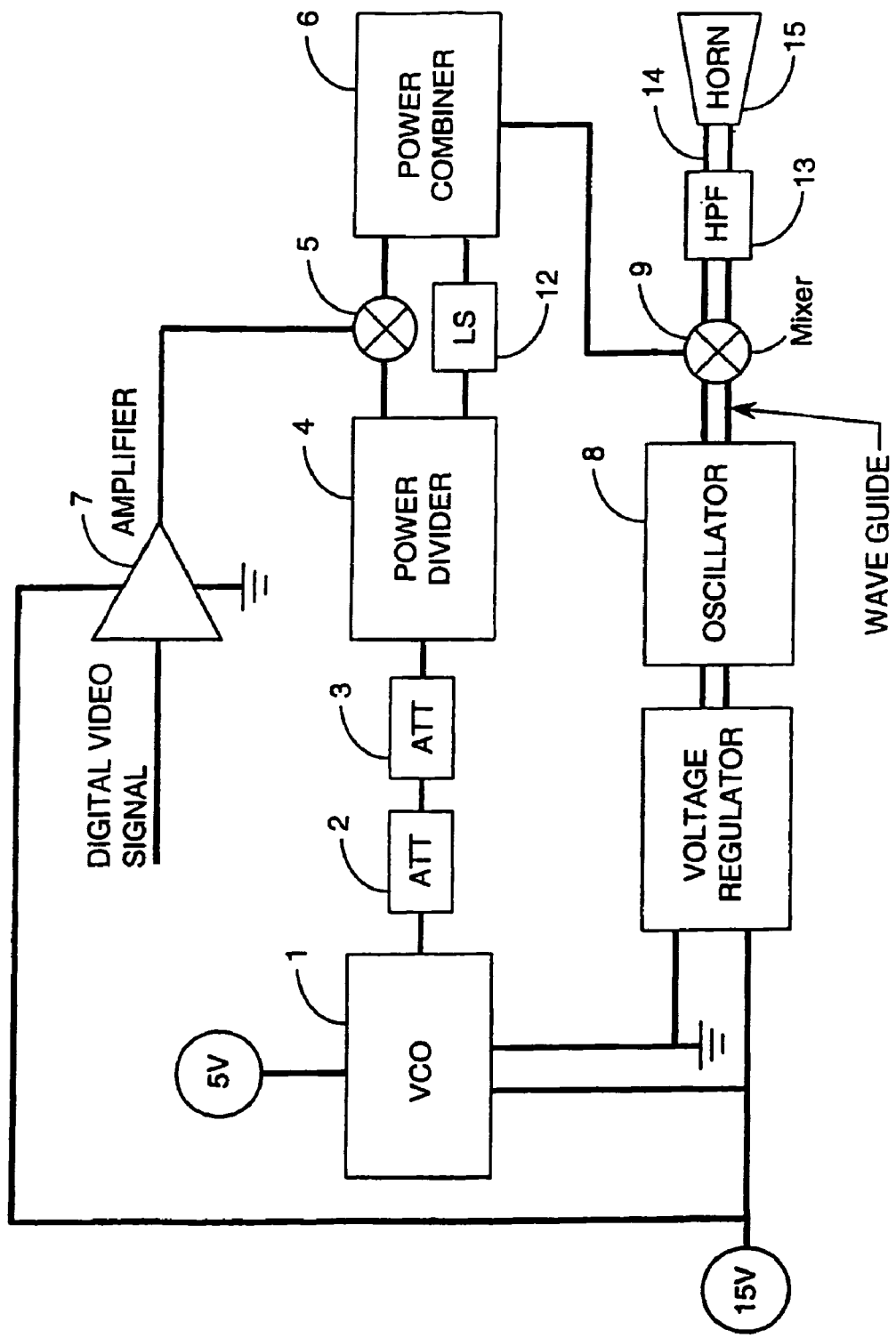
FIG. 7 is a schematic diagram of a millimeter-wave transmitter of a prototype transceiver system built and tested by Applicants.

The circuit diagram for the millimeter-wave transmitter is shown in FIG. 7. Voltage-controlled microwave oscillator 1, Westec Model VTS133/V4, is tuned to transmit at 10 GHz, attenuated by 16 dB with coaxial attenuators 2 and 3, and divided into two channels in two-way power divider 4. A digital modulation signal is pre-amplified in amplifier 7, and mixed with the microwave source power in triple-balanced mixer 5, Pacific Microwave Model M3001HA. The modulated source power is combined with the un-modulated source power through a two-way power combiner 6. A line stretcher 12 in the path of the un-modulated source power controls the depth of modulation of the combined output by adjusting for constructive or destructive phase summation. The amplitude-modulated 10 GHz signal is mixed with a signal from an 85-GHz source oscillator 8 in mixer 9 and high-pass filtered in waveguide filter 13 to reject the 75 GHz image band. The resultant, amplitude-modulated 95 GHz signal contains spectral components between 93 and 97 GHz, assuming unfiltered 1.25 Gbps modulation. A rectangular WR-10 wave guide output of the high pass filter is converted to a circular wave guide 14 and fed to a circular horn 15 of 4 inches diameter, where it is transmitted into free space. The horn projects a half-power beam width of 2.2 degrees.

Figure 8:
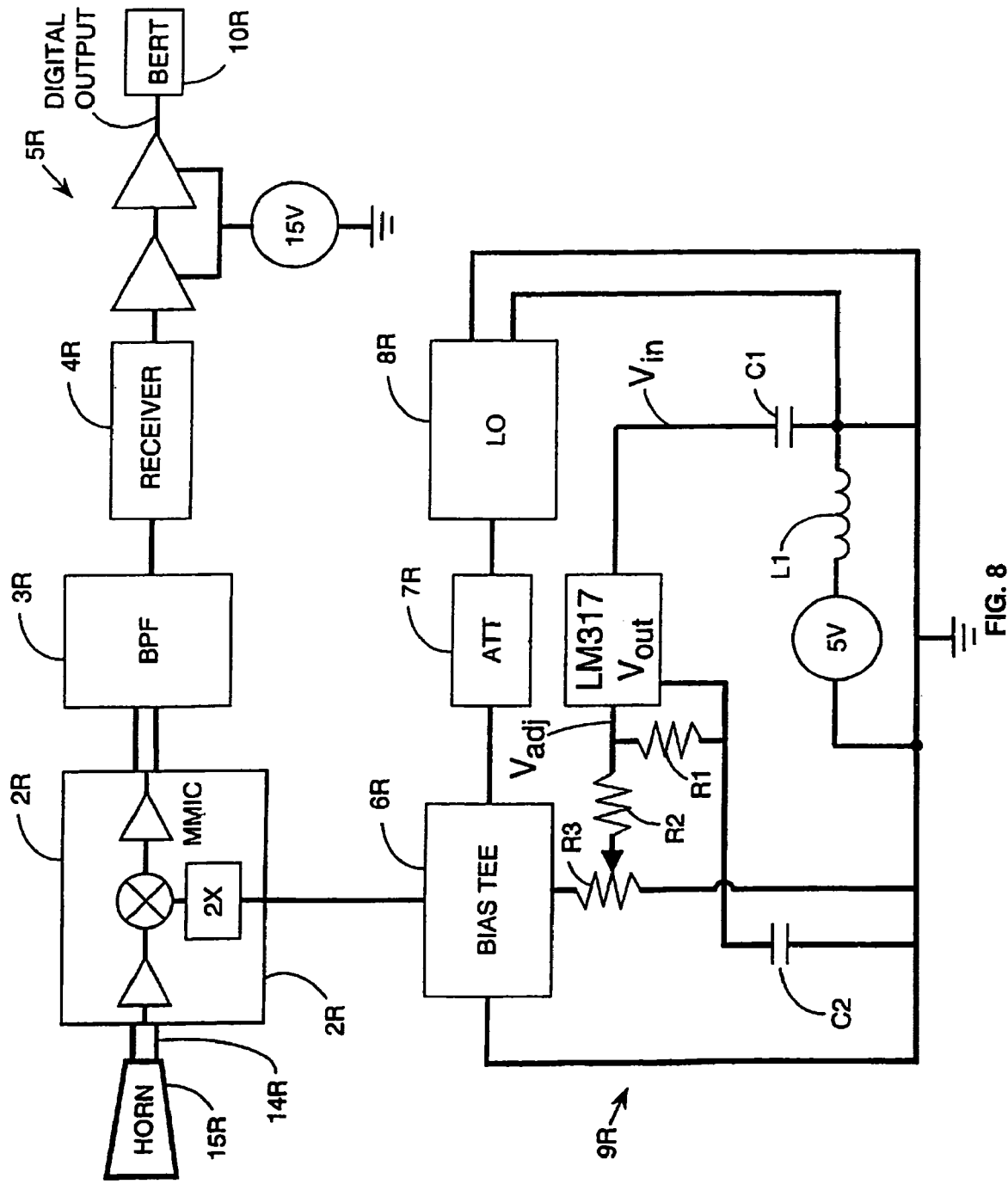
FIG. 8 is a schematic diagram of a millimeter-wave receiver of a prototype transceiver system built and tested by Applicants.

The circuit diagram for the receiver is shown in FIG. 8. The antenna is a circular horn 15R of 6 inches in diameter, fed from a waveguide unit 14R consisting of a circular W-band wave-guide and a circular-to-rectangular wave-guide converter which translates the antenna feed to WR-10 wave-guide which in turn feeds heterodyne receiver module 2R.

This module consists of a monolithic millimeter-wave integrated circuit (MMIC) low-noise amplifier spanning 89-99 GHz, a mixer with a two-times frequency multiplier at the LO port, and an IF amplifier covering 5-15 GHz. These receivers are available from suppliers such as Lockheed Martin. The local oscillator 8R is a cavity-tuned Gunn oscillator operating at 42.0 GHz (Spacek Model GQ410K), feeding the mixer in module 2R through a 6 dB attenuator 7R. A bias tee 6R at the local oscillator input supplies DC power to receiver module 2R. A voltage regulator circuit using a National Semiconductor LM317 integrated circuit regulator supplies +3.3V through bias tee 6R. An IF output of the heterodyne receiver module 2R is filtered at 6-12 GHz using bandpass filter 3R from K&L Microwave. Receiver 4R which is an HP Herotek Model DTM 180AA diode detector, measures total received power. The voltage output from the diode detector is amplified in two-cascaded microwave amplifiers 5R from MiniCircuits, Model 2FL2000. The baseband output is carried on coax cable to a media converter for conversion to optical fiber, or to a Bit Error-Rate Tester (BERT) 10R.

Figure 9:
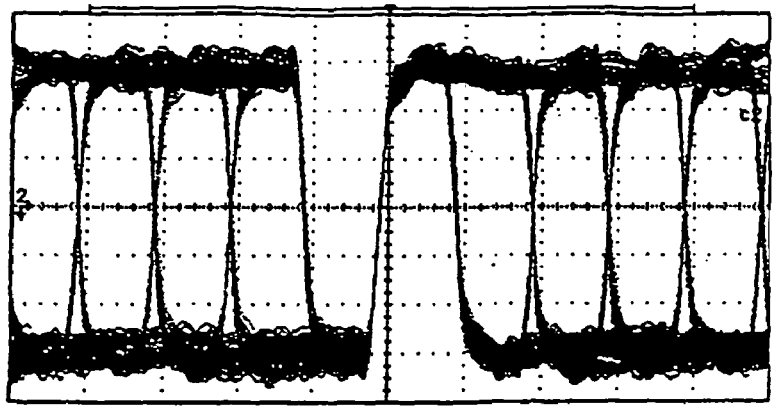
FIG. 9 is measured receiver output voltage from the prototype transceiver at a transmitted bit rate of 200 Mbps.
Figure 10:
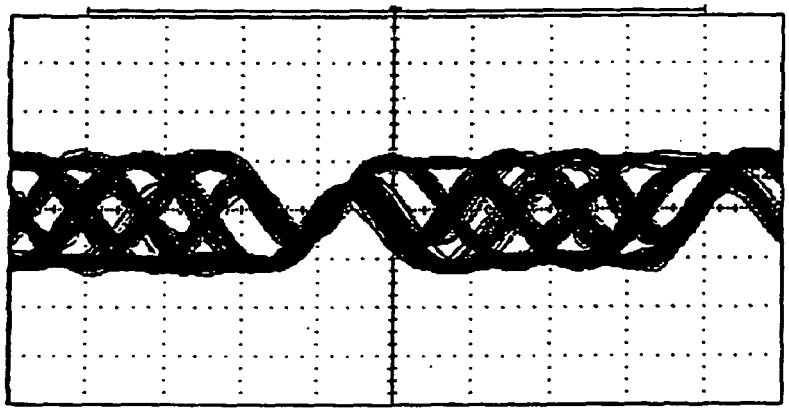
FIG. 10 is the same waveform as FIG. 9, with the bit rate increased to 1.25 Gbps.

In the laboratory, this embodiment has demonstrated a bit-error rate of less than $10^{-12}$ for digital data transmission at 1.25 Gbps. The BERT measurement unit was a Microwave Logic, Model gigaBERT. The oscilloscope signal for digital data received at 200 Mbps is shown in FIG. 9. At 1.25 Gbps, oscilloscope bandwidth limitations lead to the rounded bit edges seen in FIG. 10. Digital levels sustained for more than one bit period comprise lower fundamental frequency components (less than 312 MHz) than those which toggle each period (622 MHz), so the modulation transfer function of the oscilloscope, which falls off above 500 MHz, attenuates them less. These measurement artifacts are not reflected in the bit error-rate measurements, which yield $<10^{-12}$ bit error rate at 1.25 Gbps.

Transceiver System

A preferred embodiment of the present invention is described by reference to FIGS. 11A to 13B. The link hardware consists of a millimeter-wave transceiver pair including a pair of millimeter-wave antennas and a microwave transceiver pair including a pair of microwave antennas. The millimeter wave transmitter signal is amplitude modulated and single-sideband filtered, and includes a reduced-level carrier. The receiver includes a heterodyne mixer, phase-locked intermediate frequency (IF) tuner, and IF power detector.

Figure 12A:
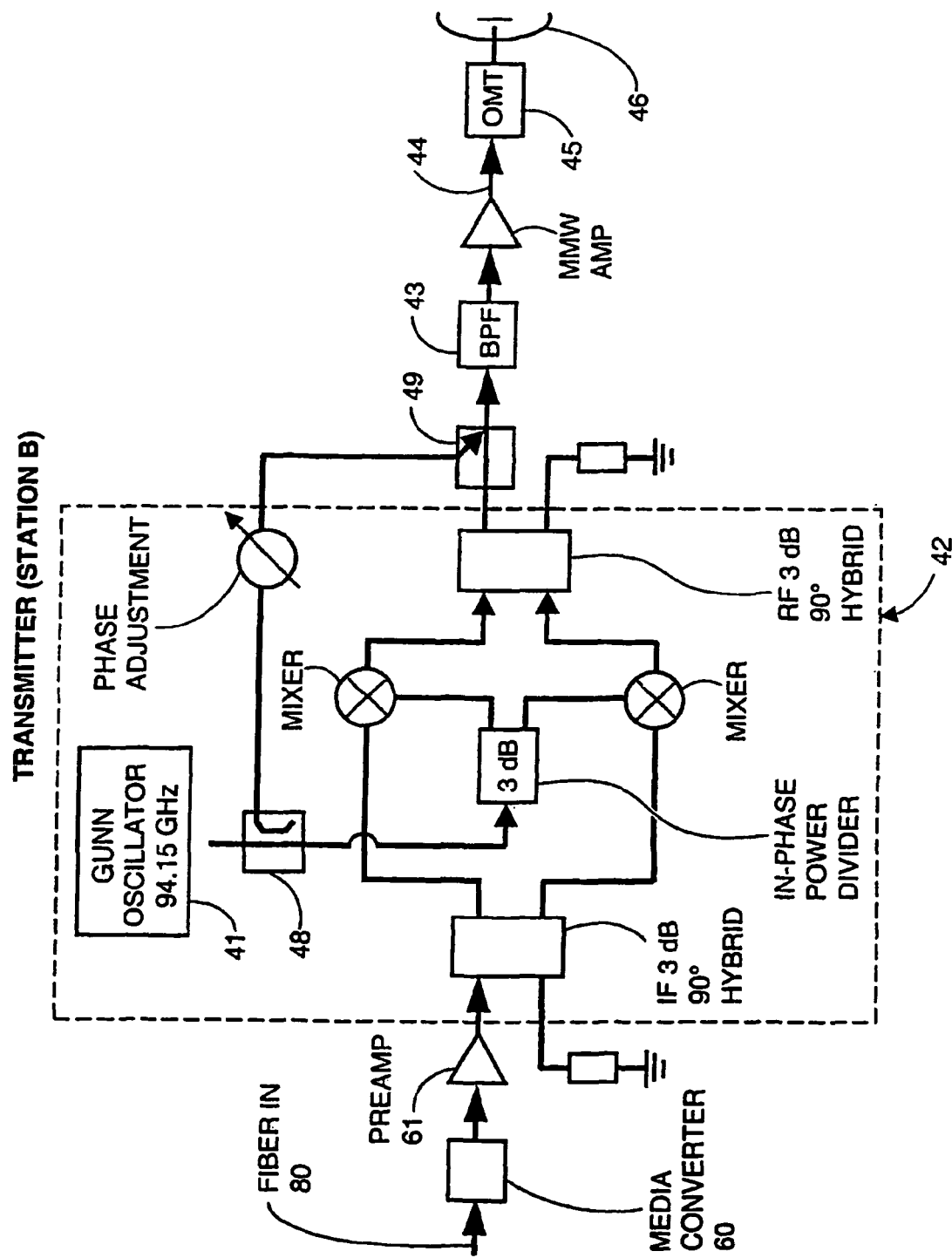
Figure 13A:
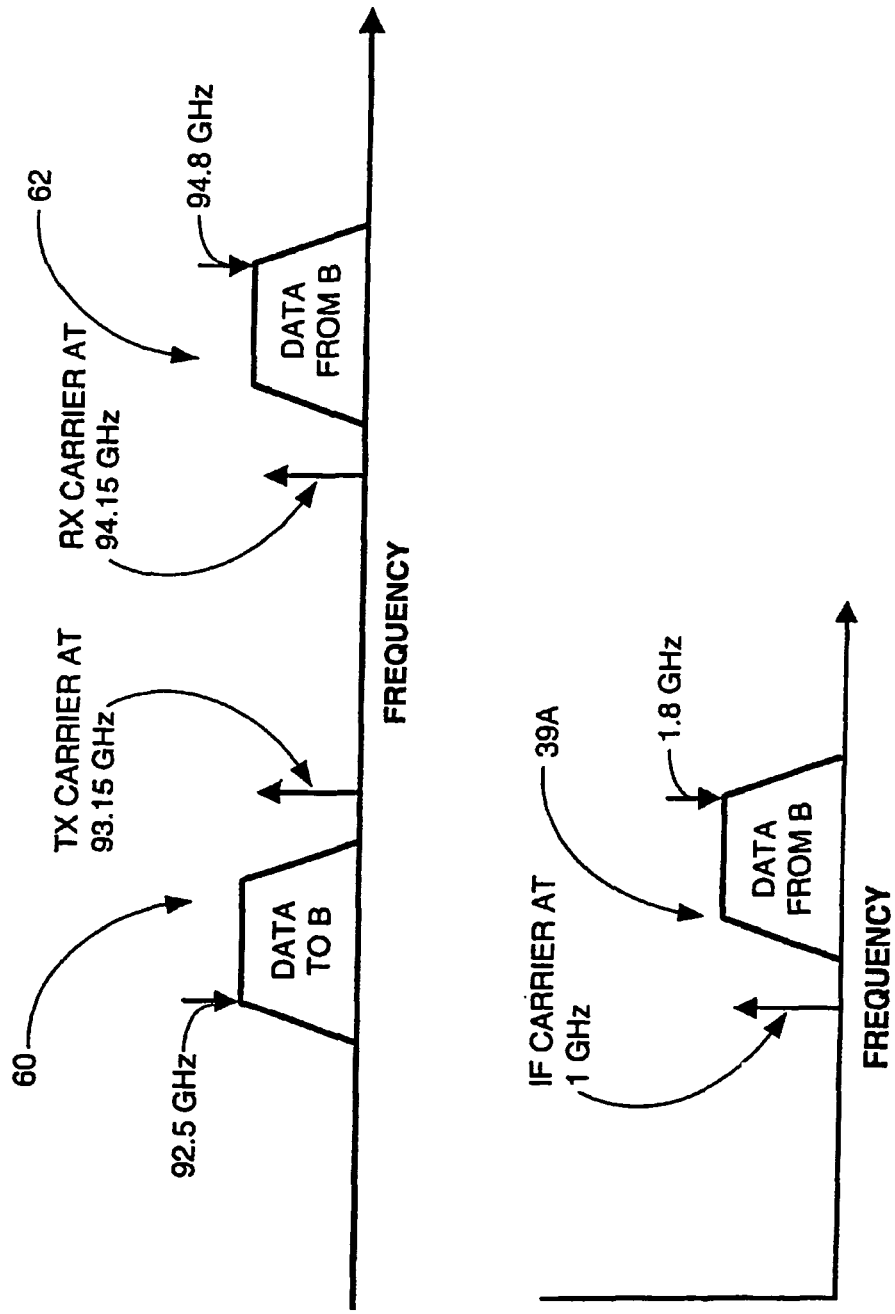
FIGS. 13A and 13B show the spectral diagrams for a preferred embodiment of the present invention.
Figure 13B:
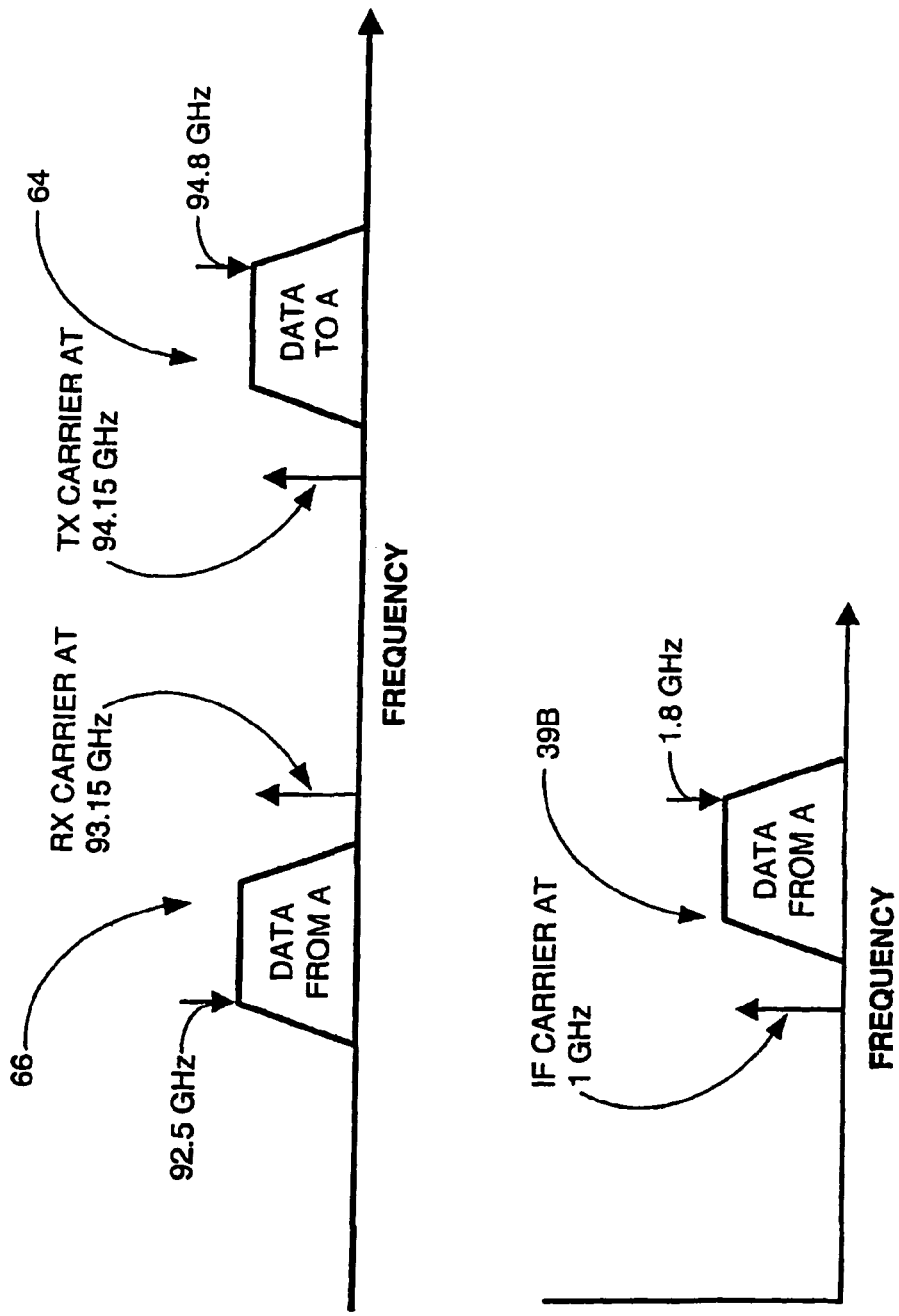

Millimeter-wave transceiver A (FIGS. 11A and 11B) transmits at 92.3-93.2 GHz as shown at 60 in FIG. 13A and receives at 94.1-95.0 GHz as shown at 62, while millimeter-wave transmitter B (FIGS. 12A and 12B) transmits at 94.1-95.0 GHz as shown at 64 in FIG. 13B and receives at 92.3-93.2 GHz as shown at 66.

Millimeter Wave Transceiver A

Figure 11A:
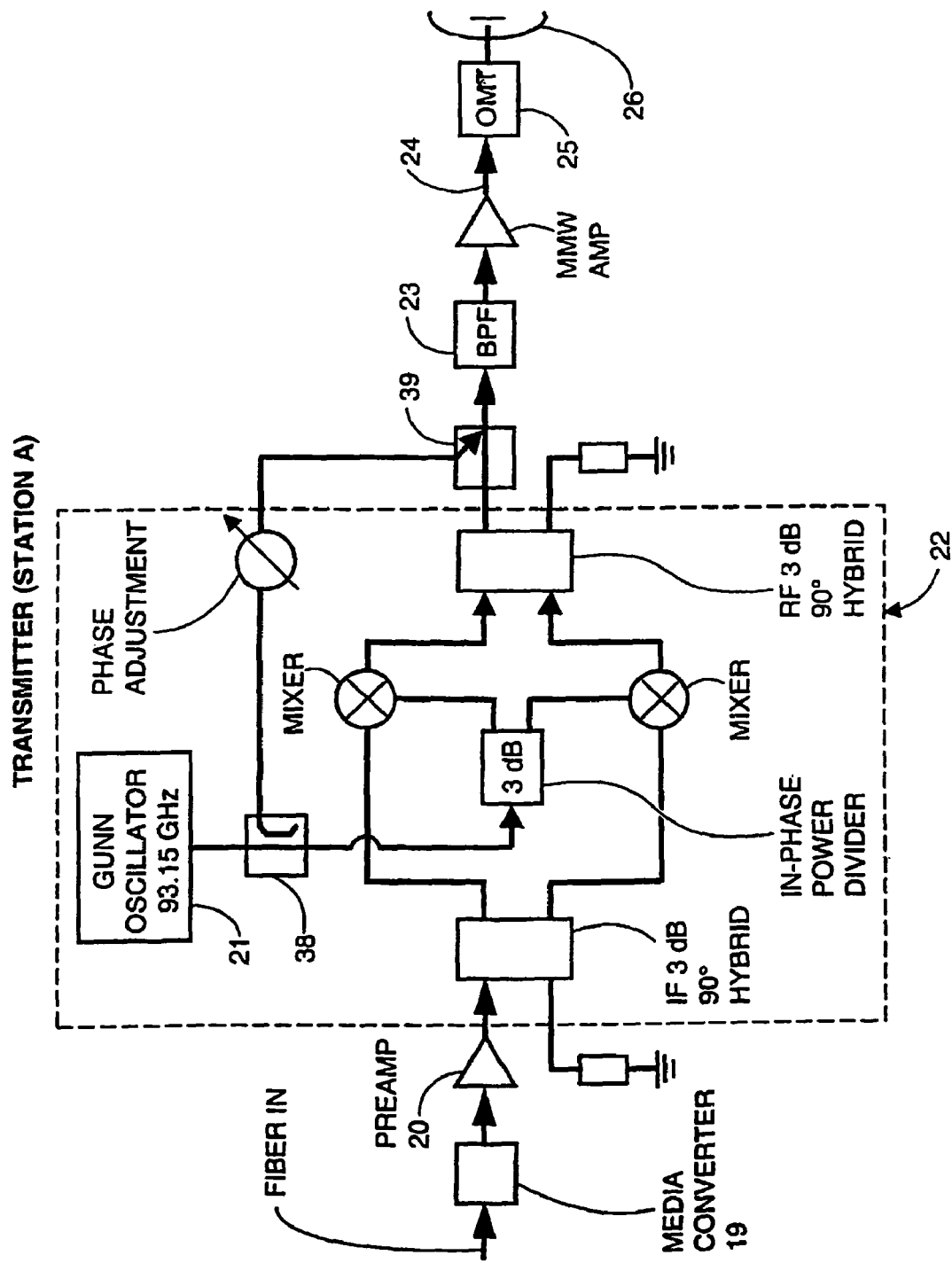

As shown in FIG. 11A in millimeter-wave transceiver A, transmit power is generated with a cavity-tuned Gunn diode 21 resonating at 93.15 GHz. This power is amplitude modulated using two balanced mixers in an image reject configuration 22, selecting the lower sideband only. The source 21 is modulated at 1.25 Gbps in conjunction with Gigabit-Ethernet standards. The modulating signal is brought in on optical fiber, converted to an electrical signal in media converter 19 (which in this case is an Agilent model HFCT-5912E) and amplified in preamplifier 20. The amplitude-modulated source is filtered in a 900 MHz-wide passband between 92.3 and 93.2 GHz, using a bandpass filter 23 on microstrip. A portion of the source oscillator signal is picked off with coupler 38 and combined with the lower sideband in power combiner 39, resulting in the transmitted spectrum shown at 60 in FIG. 13A. The combined signal propagates with horizontal polarization through a waveguide 24 to one port of an orthomode transducer 25, and on to a two-foot diameter Cassegrain dish antenna 26, where it is transmitted into free space with horizontal polarization.

Figure 2:
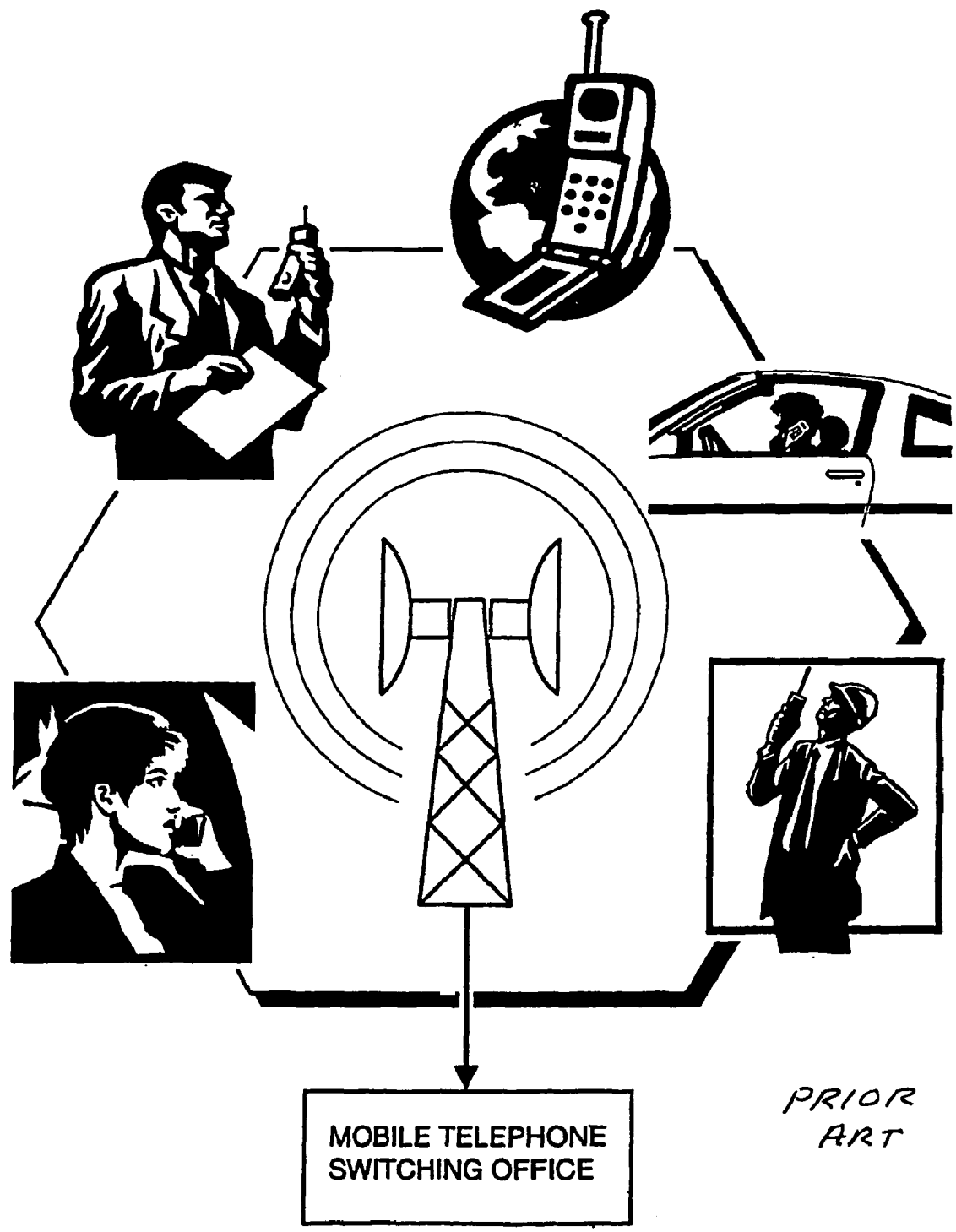
FIG. 2 is a sketch showing features of a single prior art cell.

The receiver unit at Station A as shown on FIGS. 11B1 and 11B2 is fed from the same Cassegrain antenna 26 as is used by the transmitter, at vertical polarization (orthogonal to that of the transmitter), through the other port of the orthomode transducer 25. The received signal is pre-filtered with bandpass filter 28A in a passband from 94.1 to 95.0 GHz, to reject back scattered return from the local transmitter. The filtered signal is then amplified with a monolithic MMW integrated-circuit amplifier 29 on indium phosphide, and filtered again in the same passband with bandpass filter 28B. This twice filtered signal is mixed with the transmitter source oscillator 21 using a heterodyne mixer-downconverter 30, to an IF frequency of 1.00-1.85 GHz, giving the spectrum shown at 39A in FIG. 13A. A portion of the IF signal, picked off with coupler 40, is detected with integrating power detector 15 and fed to an automatic gain control circuit 36. The fixed-level IF output is passed to the next stage as shown in FIG. 11B2. Here a quadrature-based (I/Q) phase-locked synchronous detector circuit 31 is incorporated, locking on the carrier frequency of the remote source oscillator. The loop is controlled with a microprocessor 32 to minimize power in the "Q" channel while verifying power above a set threshold in the "I" channel. Both "I" and "Q" channels are lowpass-filtered at 200 MHz using lowpass filters 33A and 33B, and power is measured in both the "I" and "Q" channels using square-law diode detectors 34. The baseband mixer 38 output is pre-amplified and fed through a media converter 37, which modulates a laser diode source into a fiber-optic coupler for transition to optical fiber transmission media.

Transceiver B

As shown in FIG. 12A in millimeter-wave transceiver B, transmit power is generated with a cavity-tuned Gunn diode 41 resonating at 94.15 GHz. This power is amplitude modulated using two balanced mixers in an image reject configuration 42, selecting the upper sideband only. The source 41 is modulated at 1.25 Gbps in conjunction with Gigabit-Ethernet standards. The modulating signal is brought in on optical fiber as shown at 80, converted to an electrical signal in media converter 60, and amplified in preamplifier 61. The amplitude-modulated source is filtered in a 900 MHz-wide passband between 94.1 and 95.0 GHz, using a bandpass filter 43 on microstrip. A portion of the source oscillator signal is picked off with coupler 48 and combined with the higher sideband in power combiner 49, resulting in the transmitted spectrum shown at 64 in FIG. 13B. The combined signal propagates with vertical polarization through a waveguide 44 to one port of an orthomode transducer 45, and on to a Cassegrain dish antenna 46, where it is transmitted into free space with vertical polarization. The receiver is fed from the same Cassegrain antenna 46 as the transmitter, at horizontal polarization (orthogonal to that of the transmitter), through the other port of the orthomode transducer 45. The received signal is filtered with bandpass filter 47A in a passband from 92.3 to 93.2 GHz, to reject backscattered return from the local transmitter. The filtered signal is then amplified with a monolithic MMW integrated-circuit amplifier on indium phosphide 48, and filtered again in the same passband with bandpass filter 47B. This twice filtered signal is mixed with the transmitter source oscillator 41 using a heterodyne mixer-downconverter 50, to an IF frequency of 1.00-1.85 GHz, giving the spectrum shown at 39B in FIG. 13B. A portion of the IF signal, picked off with coupler 62, is detected with integrating power detector 55 and fed to an automatic gain control circuit 56. The fixed-level IF output is passed to the next stage as shown on FIG. 12B2. Here a quadrature-based (I/Q) phase-locked synchronous detector circuit 51 is incorporated, locking on the carrier frequency of the remote source oscillator. The loop is controlled with a microprocessor 52 to minimize power in the "Q" channel while verifying power above a set threshold in the "I" channel. Both "I" and "Q" channels are lowpass-filtered at 200 MHz using a bandpass filters 53A and 53B, and power is measured in each channel using a square-law diode detector 54. The baseband mixer 58 output is pre-amplified and fed through a media converter 57, which modulates a laser diode source into a fiber-optic coupler for transition to optical fiber transmission media.

QPSK Millimeter Wave Radio Transceiver

FIG. 14 shows a preferred embodiment for a millimeter wave radio transceiver being built by Applicants which operates simultaneously from a single antenna in the 71-76 GHz band and the 81-86 GHz band on the same polarization. In the embodiment shown, the transceiver transmits radiation centered at the 73.5 GHz millimeter wave frequency, and receives radiation centered at the 83.5 GHz millimeter wave frequency. A paired transceiver which communicates with the transceiver shown receives at 73.5 GHz and transmits at 83.5 GHz. All of the transceiver modules are identical for the two paired transceivers, except that the local oscillator and mixer module frequencies are reversed. This transceiver is compatible with phase shift keyed modulation, and amplifiers and high power amplifiers which can operate near saturation.

Digital data at a data rate of 2.488 Gbps (corresponding to fiber optic communications standard OC-48) is incident through a fiber optic cable as indicated at 401 to the Demark (Demarcation) box 400 on the left. Power is also supplied to this box, either at 48 V DC, or 110 or 220 V AC. This power is first converted to 48 V DC, and then the power is converted to low voltage DC power of various values such as +/−5V and +/−12 V by DC to DC power supplies for use by the various modules in the transceiver. The incoming 2.488 Gbps data then enters the Encoder module 402 where it is encoded in a format appropriate for QPSK modulation. If no error correction or auxiliary channel bits are desired, the incoming data is demultiplexed (on alternate bits) into two data streams at 1.244 Gbps. If error correction, encryption, or the addition of auxiliary channel bits is desired, these are added at this point resulting in two data streams at a slightly higher data rate. Bits from each data stream are then combined to form a dibit, and subsequent dibits are compared (essentially through a 2 bit subtraction process) to form an I and Q data stream which differentially encodes the incoming data. The I and Q data streams (at 1.244 Gbps if extra bits have not been added) drive a 4 phase modulator 404 which changes the phase of a 13.312 GHz oscillator signal. The output of the 4 phase modulator is a signal at 13.312 GHz as indicated at 404 which has its phase changed through 4 different possible phase values separated by 90 degrees at a baud rate of 1.244 Gbps. The amount of rotation from the previous state depends on the incoming digital dibit. (A 00 corresponds to no phase change, 01 to 90 degree phase change, 10 to 180 degree phase change and 11 to 270 degree phase change). The 13.312 GHz modulated oscillator signal is then combined with a 60.188 GHz local oscillator signal in mixer 406 to form a signal centered at 73.5 GHz. As indicated at 408 the local oscillator utilizes a phase locked dielectric resonant oscillator (PLDRO) signal at 10.031 which has been multiplied in frequency by a factor of 6. The 73.5 GHz signal is then amplified to a power near 20 dBm (100 mW) by a first amplifier module 410, and then (optionally) amplified to a power near 2 W by a power amplifier 412. The amplified signal enters a frequency division diplexer 414 which routes the 73.5 GHz frequency band to an output waveguide, past a power detector 416 (to measure the transit power) and then to a parabolic 2 foot diameter antenna 418 for transmission along a line of sight through free space to the paired transceiver.

At the same time, incoming millimeter wave radiation centered at 83.5 GHz transmitted by a paired transceiver (not shown) is received at the two foot parabolic antenna 418 and passes through the waveguide to the frequency division diplexer. The 83.5 GHz radiation is passed by the diplexer to the lower arm of the diagram in FIG. 14. It is then amplified by low noise amplifier 419 and mixed in mixer 422 with the signal from a local oscillator 420 operating at 70.188 GHz. The 70.188 GHz frequency is generated by multiplying a signal from a phase locked dielectric resonance oscillator (PLDRO) locked to a frequency of 11.698 GHz by a factor of 6 (through a times 2 and a times 3 multiplier). The output of mixer 422 is a signal centered at 13.312 GHz which is filtered and amplified by the IF Amplifier module 424. The receive signal strength is also measured at this stage. After further amplification and filtering, the incoming 13.312 GHz signal enters the demodulation and phase locked loop module 426 where an I and Q digital data stream are extracted. The I and Q data streams at 1.244 Gbaud then enter the decoder module where the 2.488 Gbps data stream sent from the paired transceiver is reconstructed. Decoder 402 basically computes the difference between sequential pairs of I and Q data, which corresponds to the dibits originally encoded at the paired transceiver. (The I and Q are related to the phase of the incoming signal with some ambiguity, but the difference in phase is known. If the phase has changed by 0 degrees, then the transmitted dibit was 00, 90 degrees corresponds to 01, 180 degrees corresponds to 10 and 270 degrees corresponds to 11). The decoded dibits are then remultiplexed into a 2.488 Gbps data stream for transmission to the demark box 400 and then through fiber optic cable 401 to the user.

Very Narrow Beam Width

A dish antenna of two-foot diameter projects a half-power beam width of about 0.36 degrees at 94 GHz and about 0.4 degrees in the range of 71 to 86 GHz. The full-power beam width (to first nulls in antenna pattern) is narrower than 0.9 degrees. This suggests that up to 400 independent beams could be projected azimuthally around an equator from a single transmitter location, without mutual interference, from an array of 2-foot dishes. At a distance of five miles, two receivers placed 400 feet apart can receive independent data channels from the same transmitter location. Conversely, two receivers in a single location can discriminate independent data channels from two transmitters ten miles away, even when the transmitters are as close as 400 feet apart. Larger dishes can be used for even more directivity.

Backup Microwave Transceiver Pair

During severe weather conditions data transmission quality will deteriorate at millimeter wave frequencies. Therefore, in preferred embodiments of the present invention a backup communication link is provided which automatically goes into action whenever a predetermined drop-off in quality transmission is detected. A preferred backup system is a microwave transceiver pair operating in the 10.7-11.7 GHz band. This frequency band is already allocated by the FCC for fixed point-to-point operation. FCC service rules parcel the band into channels of 40-MHz maximum bandwidth, limiting the maximum data rate for digital transmissions to 45 Mbps full duplex. Transceivers offering this data rate within this band are available: off-the-shelf from vendors such as Western Multiplex Corporation (Models Lynx DS-3, Tsunami 100 BaseT), and DMC Stratex Networks (Model DXR700 and Altium 155). The digital radios are licensed under FCC Part 101 regulations. The microwave antennas are Cassegrain dish antennas of 24-inch diameter. At this diameter, the half-power beamwidth of the dish antenna is 3.0 degrees, and the full-power beamwidth is 7.4 degrees, so the risk of interference is higher than for MMW antennas. To compensate this, the FCC allocates twelve separate transmit and twelve separate receive channels for spectrum coordination within the 10.7-11.7 GHz band. Sensing of a millimeter wave link failure and switching to redundant microwave channel is an existing automated feature of the network routing switching hardware available off-the-shelf from vendors such as Cisco, Foundry Networks and Juniper Networks.

The reader should understand that in many installations the provision of a backup system will not be justified from a cost-benefit analysis depending on factors such as costs, distance between transmitters, quality of service expected and the willingness of customers to pay for continuing service in the worse weather conditions.

Narrow Beam Width Antennas

The narrow antenna beam widths afforded at millimeter-wave frequencies allow for geographical partitioning of the airwaves, which is impossible at lower frequencies. This fact eliminates the need for band parceling (frequency sharing), and so enables wireless communications over a much larger total bandwidth, and thus at much higher data rates, than were ever previously possible at lower RF frequencies.

The ability to manufacture and deploy antennas with beam widths narrow enough to ensure non-interference, requires mechanical tolerances, pointing accuracies, and electronic beam steering/tracking capabilities, which exceed the capabilities of the prior art in communications antennas. A preferred antenna for long-range communication at frequencies above 70 GHz has gain in excess of 50 dB, 100 times higher than direct-broadcast satellite dishes for the home, and 30 times higher than high-resolution weather radar antennas on aircraft. However, where interference is not a potential problem, antennas with dB gains of 40 to 45 may be preferred.

Most antennas used for high-gain applications utilize a large parabolic primary collector in one of a variety of geometries. The prime-focus antenna places the receiver directly at the focus of the parabola The Cassegrain antenna places a convex hyperboloidal secondary reflector in front of the focus to reflect the focus back through an aperture in the primary to allow mounting the receiver behind the dish. (This is convenient since the dish is typically supported from behind as well.) The Gregorian antenna is similar to the Cassegrain antenna, except that the secondary mirror is a concave ellipsoid placed in back of the parabola's focus. An offset parabola rotates the focus away from the center of the dish for less aperture blockage and improved mounting geometry. Cassegrain, prime focus, and offset parabolic antennas are the preferred dish geometries for the MMW communication system.

A preferred primary dish reflector is a conductive parabola. The preferred surface tolerance on the dish is about 15 thousandths of an inch (15 mils) for applications below 40 GHz, but closer to 5 mils for use at 94 GHz. Typical hydroformed aluminum dishes give 15-mil surface tolerances, although double-skinned laminates (using two aluminum layers surrounding a spacer layer) could improve this to 5 mils. The secondary reflector in the Cassegrainian geometry is a small, machined aluminum "lollipop" which can be made to mil tolerance without difficulty. Mounts for secondary reflectors and receiver waveguide horns preferably comprise mechanical fine-tuning adjustment for in-situ alignment on an antenna test range.

Flat Panel Antenna

Another preferred antenna for long-range MMW communication is a flat-panel slot array antenna such as that described by one of the present inventors and others in U.S. Pat. No. 6,037,908, issued 14 Mar. 2000, which is hereby incorporated herein by reference. That antenna is a planar phased array antenna propagating a traveling wave through the radiating aperture in a transverse electromagnetic (TEM) mode. A communications antenna would comprise a variant of that antenna incorporating the planar phased array, but eliminating the frequency-scanning characteristics of the antenna in the prior art by adding a hybrid traveling-wave/corporate feed. Flat plates holding a 5-mil surface tolerance are substantially cheaper and easier to fabricate than parabolic surfaces. Planar slot arrays utilize circuit-board processing techniques (e.g. photolithography), which are inherently very precise, rather than expensive high-precision machining.

Coarse and Fine Pointing

Pointing a high-gain antenna requires coarse and fine positioning. Coarse positioning can be accomplished initially using a visual sight such as a bore-sighted rifle scope or laser pointer. The antenna is locked in its final coarse position prior to fine-tuning. The fine adjustment is performed with the remote transmitter turned on. A power meter connected to the receiver is monitored for maximum power as the fine positioner is adjusted and locked down.

At gain levels above 50 dB, wind loading and tower or building flexure can cause an unacceptable level of beam wander. A flimsy antenna mount could not only result in loss of service to a wireless customer; it could inadvertently cause interference with other licensed beam paths. In order to maintain transmission only within a specific "pipe," some method for electronic beam steering may be required.

Beam Steering

Phased-array beam combining from several ports in a flat-panel phased array could steer the beam over many antenna beam widths without mechanically rotating the antenna itself. Sum-and-difference phase combining in a mono-pulse receiver configuration locates and locks on the proper "pipe." In a Cassegrain antenna, a rotating, slightly unbalanced secondary ("conical scan") could mechanically steer the beam without moving the large primary dish. For prime focus and offset parabolas, a multi-aperture (e.g. quad-cell) floating focus could be used with a selectable switching array. In these dish architectures, beam tracking is based upon maximizing signal power into the receiver. In all cases, the common aperture for the receiver and transmitter ensures that the transmitter, as well as the receiver, is correctly pointed.

Other Wireless Techniques

Any millimeter-wave carrier frequency consistent with U.S. Federal Communications Commission spectrum allocations and service rules, including MMW bands currently allocated for fixed point-to-point services at 57-64 GHz, 71-76 GHz, 81-86 GHz, and 92-95 GHz, can be utilized in the practice of this invention. Likewise any of the several currently-allocated microwave bands, including 5.2-5.9 GHz, 5.9-6.9 GHz, 10.7-11.7 GHz, 17.7-19.7 GHz, and 21.2-23.6 GHz can be utilized for the backup link. The modulation bandwidth and modulation technique of both the MMW and microwave channels can be increased, limited again only by FCC spectrum allocations. Also, any flat, conformal, or shaped antenna capable of transmitting the modulated carrier over the link distance in a means consistent with FCC emissions regulations can be used. Horns, prime focus and offset parabolic dishes, and planar slot arrays are all included.

Transmit power may be generated with a Gunn diode source, an injection-locked amplifier or a MMW tube source resonating at the chosen carrier frequency or at any subharmonic of that frequency. Source power can be amplitude, frequency or phase modulated using a PIN switch, a mixer or a bi-phase or continuous phase modulator. Modulation can take the form of simple bi-state AM modulation, or can involve more than two symbol states; e.g. using quantized amplitude modulation (QAM). Double-sideband (DSB), single-sideband (SSB) or vestigial sideband (VSB) techniques can be used to pass, suppress or reduce one AM sideband and thereby affect bandwidth efficiency. Phase or frequency modulation schemes can also be used, including simple FM, bi-phase or quadrature phase-shift keying (QPSK) or 8 PSK or higher. Transmission with a full or suppressed carrier can be used. Digital source modulation can be performed at any date rate in bits per second up to eight times the modulation bandwidth in Hertz, using suitable symbol transmission schemes. Analog modulation can also be performed. A monolithic or discrete-component power amplifier can be incorporated after the modulator to boost the output power. Linear or circular polarization can be used in any combination with carrier frequencies to provide polarization and frequency diversity between transmitter and receiver channels. A pair of dishes can be used instead of a single dish to provide spatial diversity in a single transceiver as well.

The MMW Gunn diode and MMW amplifier can be made on indium phosphide, gallium arsenide, or metamorphic InP-on-GaAs. The MMW amplifier can be eliminated completely for short-range links. The mixer/downconverter can be made on a monolithic integrated circuit or fabricated from discrete mixer diodes on doped silicon, gallium arsenide, or indium phosphide. The phase lock loop can use a microprocessor-controlled quadrature (I/Q) comparator or a scanning filter. The detector can be fabricated on silicon or gallium arsenide, or can comprise a heterostructure diode using indium antimonide. The backup transceivers can use alternative bands 5.9-6.9 GHz, 17.7-19.7 GHz, or 21.2-23.6 GHz; all of which are covered under FCC Part 101 licensing regulations. The antennas can be Cassegrainian, offset or prime focus dishes, or flat panel slot array antennas, of any size appropriate to achieve suitable gain.

Prefabricated Wireless Internet Base Station

In preferred embodiments prefabricated base stations are provided for quick and easy installation on commercial building roof-tops. All of the components of the base station as described above are pre-assembled in the prefabricated station. These components include the low frequency wireless transceiver for communication with users and the millimeter wave transceiver for operation as a part of the trunk line as described above.

Temporary, Emergency and Military Applications

In preferred embodiments all components of the base stations described above are mounted on trucks that can provide emergency wireless telephone networks, wireless computer network and wireless Internet access. These truck mounted systems can also be used for temporary service to a region prior to and during the installation of fiber optic service to the region. Truck mounted systems can also be used by the military to provide wireless communication in battlefield situations.

While the above description contains many specifications, the reader should not construe these as a limitation on the scope of the invention, but merely as exemplifications of preferred embodiments thereof. For example, the 71.0-76 GHz and 81.0 to 86 GHz bands utilized for point to point trunk lines would work very well in the above applications. The present invention is especially useful in those locations where fiber optics communication is not available and the distances between communications sites are less than about 10 km but longer than the distances that could be reasonably served with free space laser communication devices. Ranges of about 0.5 km to 2 km are ideal for the application of the present invention. However, space or in regions with mostly clear weather the system could provide good service to distances of 5 km or more. Accordingly, the reader is requested to determine the scope of the invention by the appended claims and their legal equivalents, and not by the examples given above.

What is claimed is:

1. A communications system providing wireless communication for a plurality of cellular base stations, said system comprising:
   A) at least one connecting station comprising at least one millimeter wave wireless transceiver in communication with a fiber optic or high-speed cable communication network and adapted to communicate at millimeter wave frequencies higher than 60 GHz with another millimeter wave transceiver at at least one of said cellular base stations;
   B) a plurality of cellular base stations, each of said base stations serving a communication cell and each of said base stations comprising:
      1) at least one low frequency wireless transceiver for communicating with a plurality of users within said communication cell at a radio frequency lower than 6 GHz;
      2) at least one millimeter wave wireless transceiver operating at a millimeter wave frequency higher than 60 GHz for communicating with another millimeter wave transceiver at another base station or a millimeter wave transceiver at said at least one connecting station; and
      3) a data transfer means for transferring data communicated through said at least one low frequency transceiver to said at least one millimeter wave wireless transceiver and for transferring data communicated through said at least one millimeter wave wireless transceiver to said at least one low frequency wireless transceiver.

2. The system as in claim 1 wherein said system is a part of a telephone system.

3. The system as in claim 1 wherein said system is a part of an Internet system.

4. The system as in claim 1 wherein said system is a part of a computer network.

5. The communication system as in claim 1 wherein each of said base station high frequency wireless transceivers is configured to transmit to and receive from a second site digital information at rates in excess of 1 billion bits per second during normal weather, said high frequency wireless transceivers each comprising an antenna producing a beam having a half-power beam width of about 2 degrees or less.

6. The system as in claim 1 and further comprising a back-up transceiver system operating at a data transmittal rate of less than 155 million bits per second configured to continue transmittal of information between said base stations in the event of abnormal weather conditions.

7. The system as in claim 6 wherein said back-up transceiver system is a microwave system.

8. The system as in claim 1 wherein said millimeter wave wireless transceivers are equipped with antennas providing a gain of greater than 40 dB.

9. The system as in claim 1 wherein said millimeter wave wireless transceivers are capable of transmitting and receiving at rates in excess of 1 billion bits per second and the antennas of said high frequency wireless transceivers are configured to produce beams having half-power beam widths of about 0.36 degrees or less.

10. The system as in claim 1 wherein a plurality of said millimeter wave wireless transceivers are configured to transmit at frequencies in the range of about 71-76 GHz.

11. The system as in claim 1 wherein a plurality of said millimeter wave wireless transceivers are configured to transmit at frequencies in the range of about 81-86 GHz.

12. The system as in claim 1 wherein at least one of said cellular base stations comprises a vehicle on which said at least one low frequency wireless transceiver and said at least one millimeter wave wireless transceiver are mounted.

13. A communications system providing wireless communication with system users and having a wireless millimeter wave trunk line for communicating with a communication office, said system comprising:
   A) a plurality of cellular base stations each of said base stations serving a communication cell, each of said base stations comprising:
      1) at least one low frequency wireless transceiver for communicating with users within said cell at a cell phone radio frequency lower than 3 GHz,
      2) at least one high frequency wireless transceiver for communicating with other base stations as a part of said trunk line at a trunk line frequency higher than 60 GHz, and
      3) a data transfer means for transferring data communicated through said at least one low frequency transceiver to said at least one high frequency wireless transceiver and for transferring data communicated through said at least one high frequency wireless transceiver to said at least one low frequency wireless transceiver, and B) at least one high data rate communication link providing communication between said plurality of cellular base stations and said communication office.

14. A communication system as in claim 13 wherein each of said base station high frequency wireless transceivers is configured to transmit to and receive from a second site digital information at rates in excess of 1 billion bits per second during normal weather, said high frequency wireless transceivers each comprising an antenna producing a beam having a half-power beam width of about 2 degrees or less.

15. A system as in claim 13 and further comprising a back-up transceiver system operating at a data transmittal rate of less than 155 million bits per second configured to continue transmittal of information between said base stations in the event of abnormal weather conditions.

16. A system as in claim 15 wherein said back-up transceiver system is a microwave system.

17. A system as in claim 13 wherein said high frequency transceivers are equipped with antennas providing a gain of greater than 40 dB.

18. A system as in claim 13 wherein said high frequency wireless transceivers are capable of transmitting and receiving at rates in excess of 1 billion bits per second and the antennas of said high frequency wireless transceivers are configured to produce beams having half-power beam widths of about 0.36 degrees or less.

19. A system as in claim 13 wherein a plurality of said high frequency wireless transceivers are configured to transmit at frequencies in the range of about 71-76 GHz.

20. A system as in claim 13 wherein a plurality of said high frequency transceivers are configured to transmit at frequencies in the range of about 81-86 GHz.

21. A communications system providing wireless communication with system users and having a wireless millimeter wave trunk line for communicating with a fiber Point of Presence, said system comprising:

A) a plurality of wireless computer networking base stations each of said base stations serving a communication coverage area and each of said base stations comprising:

1) at least one low frequency wireless transceiver for communicating with users within said communication coverage area at a radio frequency lower than 6 GHz, 2) at least one high frequency wireless transceiver for communicating with other base stations as a part of said trunk line at a trunk line frequency higher than 60 GHz, and 3) a data transfer means for transferring data communicated through said at least one low frequency transceiver to said at least one high frequency wireless transceiver and for transferring data communicated through said at least one high frequency wireless transceiver to said at least one low frequency wireless transceiver, and B) at least one high data rate communication link providing communication between said plurality of wireless computer networking base stations and said fiber point of presence.

22. A communication system as in claim 21 wherein each of said base station high frequency wireless transceivers is configured to transmit to and receive from a second site digital information at rates in excess of 1 billion bits per second during normal weather, said high frequency wireless transceivers each comprising an antenna producing a beam having a half-power beam width of about 2 degrees or less.

23. A system as in claim 21 and further comprising a back-up transceiver system operating at a data transmittal rate of less than 155 million bits per second configured to continue transmittal of information between said base stations in the event of abnormal weather conditions.

24. A system as in claim 22 wherein said back-up transceiver system is a microwave system.

25. A system as in claim 21 wherein a plurality of said high frequency transceivers are equipped with antennas providing a gain of greater than 40 dB.

26. A system as in claim 21 wherein a plurality of said high frequency wireless transceivers are capable of transmitting and receiving at rates in excess of 1 billion bits per second and the antennas of said high frequency wireless transceivers are configured to produce beams having half-power beam widths of about 0.4 degrees or less.

27. A system as in claim 21 wherein a plurality of said high frequency wireless transceivers are configured to transmit at frequencies in the range of about 71-76 GHz.

28. A system as in claim 21 wherein a plurality of said high frequency wireless transceivers are configured to transmit at frequencies in the range of about 81-86 GHz.

29. A system as in claim 21 wherein at least one of said low frequency wireless transceivers operate according to an IEEE 802.11 standard.

30. A system as in claim 21 wherein at least one of said low frequency wireless transceivers operate at a frequency of about 2.4 GHz.

31. A system as in claim 21 wherein at least one of said low frequency wireless transceivers operate at a frequency of about 5.8 GHz.

32. A system as in claim 21 wherein at least one of said low frequency wireless transceivers is a component of a WiMax access point.

33. A system as in claim 21 wherein at least one of said low frequency wireless transceivers is a component of a WiFi access point.

34. A method for providing multiple user wireless access to a backbone fiber optic communication system, said method comprising the steps of:

A) aggregating wireless communications from a first set of users at a first wireless base station through at least one low frequency first base station transceiver operating at a radio frequency of less than 6 GHz, B) aggregating wireless communications from a second set of users at a second wireless base station through at least one low frequency second base station transceiver operating at a radio frequency of less than 6 GHz, C) providing wireless high data rate trunk line communications between said first wireless base station and said second wireless base station utilizing high frequency wireless transceivers operating at a frequency higher than 60 GHz, D) aggregating said wireless communications from said first set of users with said wireless communications from said second set of users and providing the resulting aggregated communications traffic to said backbone fiber optic communication system through a high data rate communication link to a fiber point of presence.

35. A method as in claim 34 wherein said wireless high data rate trunk line communications operates at a millimeter wave frequency between 71-76 GHz for communications traffic from said first base station to said second base station, and operates at a millimeter wave frequency between 81-86 GHz for communications traffic from said second base station to said first base station.

36. A method as in claim 34 and further comprising the steps of distributing communications to said first set of users from said first wireless base station using said low frequency first base station transceiver and distributing communications to said second set of users from said second set of users from said second wireless base station using said low frequency second base station transceiver.

37. A method as in claim 34 wherein said low frequency first and second base station transceivers use the WiMax standard.

* * * * *